(12) United States Patent
Craig

(10) Patent No.: US 10,930,170 B1
(45) Date of Patent: *Feb. 23, 2021

(54) PIANO CARDS MUSIC THEORY TEACHING METHOD AND APPARATUS

(71) Applicant: James Craig, Media, PA (US)

(72) Inventor: James Craig, Media, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/179,970

(22) Filed: Nov. 4, 2018

(51) Int. Cl.
*G09B 15/02* (2006.01)
*G09B 15/00* (2006.01)

(52) U.S. Cl.
CPC ......... *G09B 15/026* (2013.01); *G09B 15/006* (2013.01)

(58) Field of Classification Search
CPC .......................... G09B 15/026; G09B 15/006
USPC ........................................................ 84/471 R
See application file for complete search history.

(56) References Cited

U.S. PATENT DOCUMENTS

| | | | | | |
|---|---|---|---|---|---|
| 1,534,669 | A | * | 4/1925 | Young | G09B 15/026 84/481 |
| 2,221,143 | A | * | 11/1940 | Lang | G09B 15/026 84/478 |
| 2,360,534 | A | * | 10/1944 | Allen | G10G 1/02 84/483.1 |
| 2,984,143 | A | * | 5/1961 | McGinley | G10G 1/02 84/471 R |
| 3,728,931 | A | * | 4/1973 | Leonard | G09B 15/006 84/471 R |
| 3,733,956 | A | * | 5/1973 | Leonard | G09B 15/006 84/471 R |
| 4,041,828 | A | * | 8/1977 | Leonard | G09B 15/006 84/471 R |
| 4,295,407 | A | * | 10/1981 | Leonard | G09B 15/006 235/89 R |
| 4,404,886 | A | * | 9/1983 | Leonard | G09B 15/006 84/471 R |
| 4,706,536 | A | * | 11/1987 | Sanders | G10H 1/34 200/5 A |
| 5,144,875 | A | * | 9/1992 | Nakada | G10G 1/00 84/471 R |
| 5,370,539 | A | * | 12/1994 | Dillard | G09B 15/003 434/404 |
| 7,176,371 | B1 | * | 2/2007 | Jackson | G09B 15/026 84/470 R |
| 7,629,527 | B2 | * | 12/2009 | Hiner | G09B 15/02 84/470 R |
| 7,897,861 | B2 | * | 3/2011 | DeLong | G09B 15/08 84/470 R |
| 10,121,387 | B1 | * | 11/2018 | Craig | G09B 15/004 |

(Continued)

*Primary Examiner* — David S Warren
*Assistant Examiner* — Christina M Schreiber
(74) *Attorney, Agent, or Firm* — Joseph E. Maenner; Petock & Petock LLC

(57) ABSTRACT

Piano keyboard cards contain a pictured keyboard on the cards with note indicators on keys to be played and fingering numbers showing the finger to be played. These piano keyboard cards have several varieties including scale and chord keyboard cards. These piano keyboard cards can be used on their own without a piano. Also included is a music notation sheet that has all notes of music notation labeled and a fully labeled piano sheet that has all the notes on a piano labeled. Used in conjunction these sheets' line up together clarifying where each key of the piano is on a musical scale. Also included is a fully combined version of the music notation and piano sheets.

19 Claims, 31 Drawing Sheets

(56) References Cited

U.S. PATENT DOCUMENTS

| | | | |
|---|---|---|---|
| 2009/0095142 A1* | 4/2009 | Pearlman | G09B 15/026 84/473 |
| 2013/0319207 A1* | 12/2013 | King | G09B 15/023 84/471 R |
| 2013/0319208 A1* | 12/2013 | Forrest | G09B 15/023 84/478 |
| 2014/0305284 A1* | 10/2014 | Cosgrove | G09B 15/026 84/478 |
| 2015/0068387 A1* | 3/2015 | Shi | G09B 15/023 84/471 R |
| 2015/0317910 A1* | 11/2015 | Daniels | G09B 21/00 84/485 R |
| 2017/0025034 A1* | 1/2017 | Chapman | G09B 15/02 |

* cited by examiner

FIG. 2B
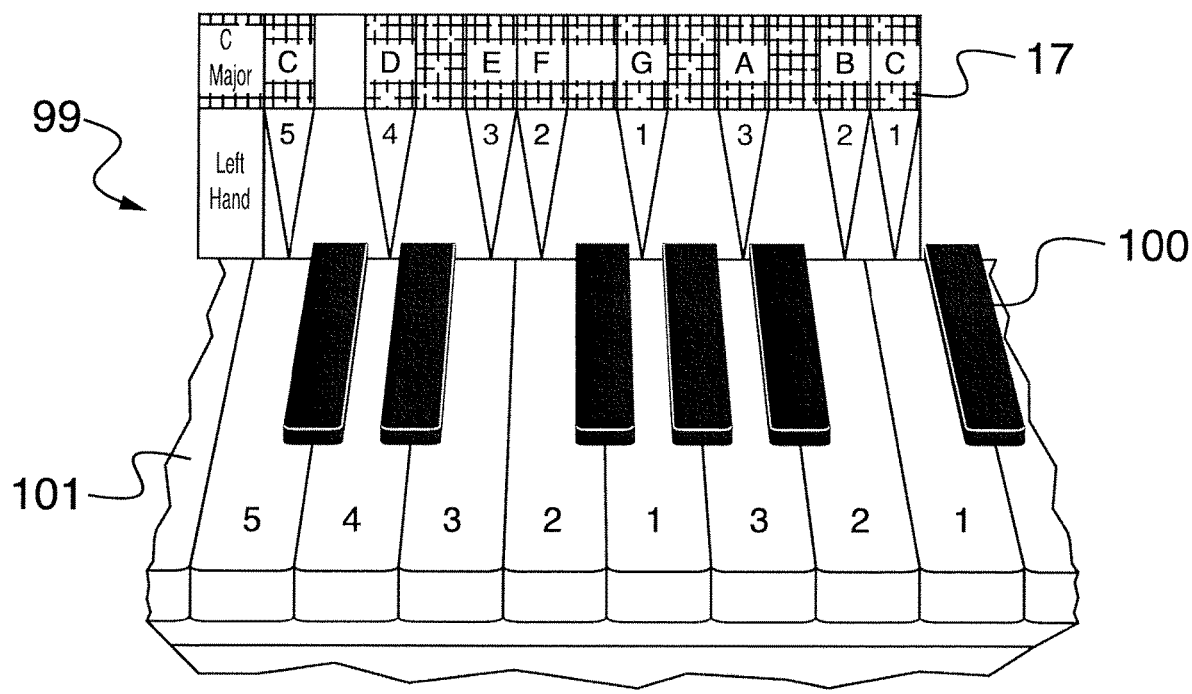
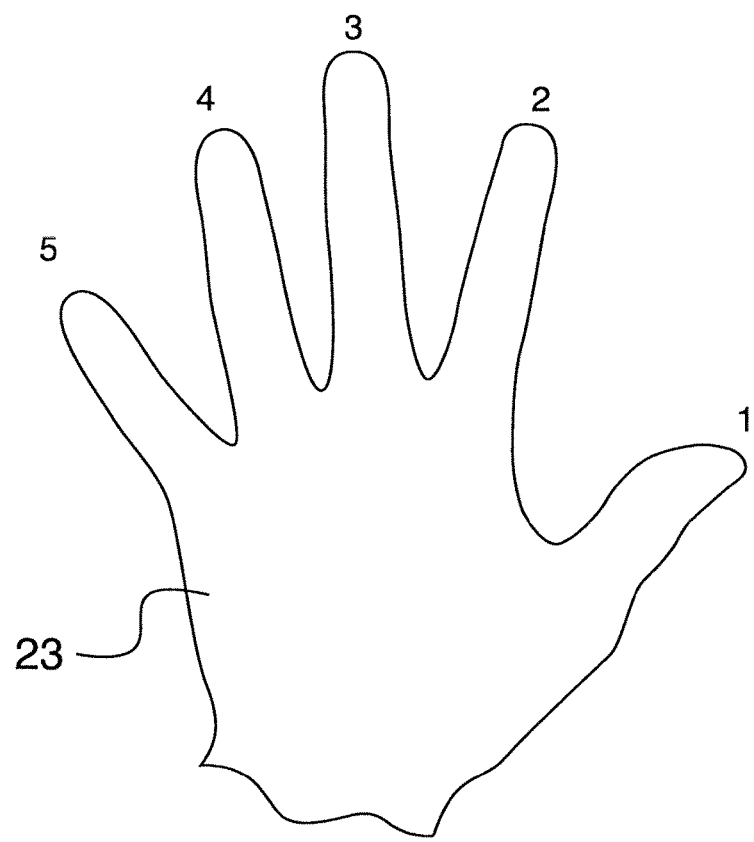

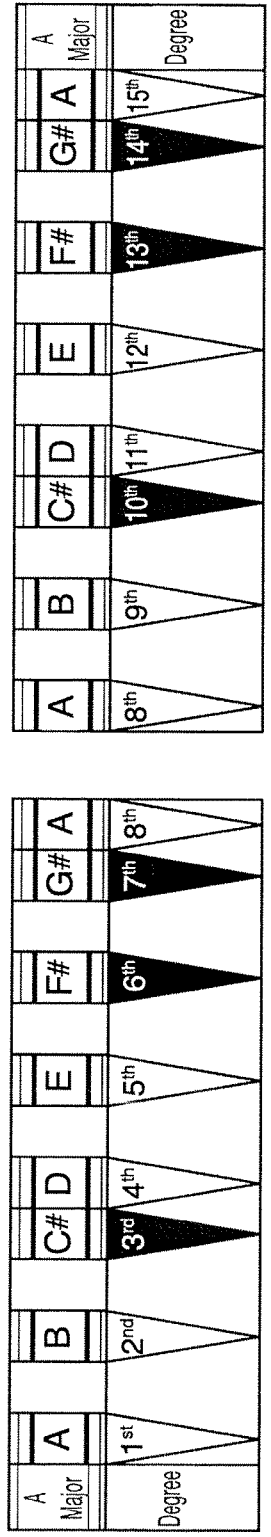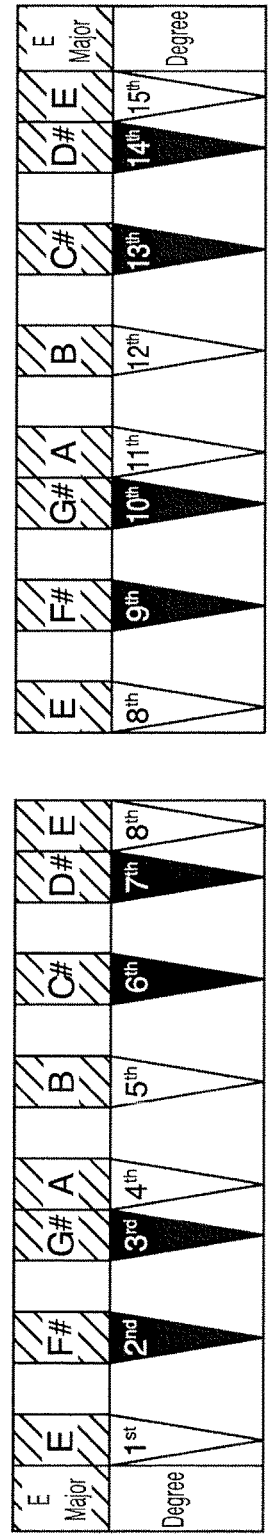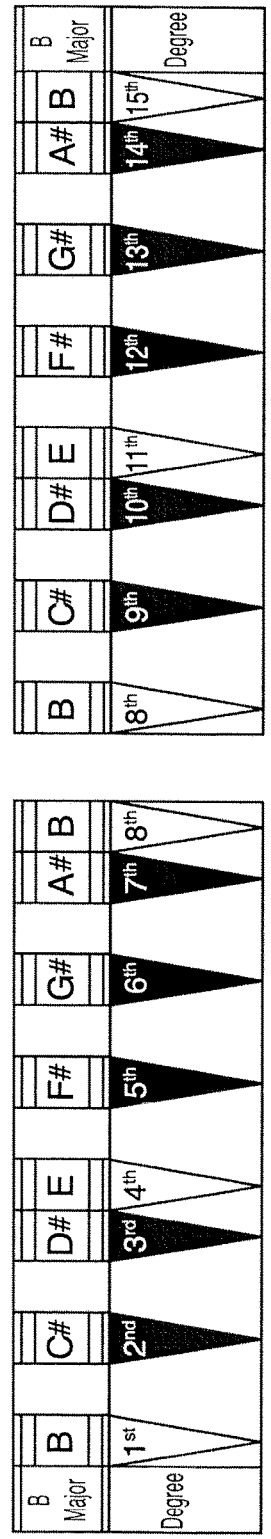

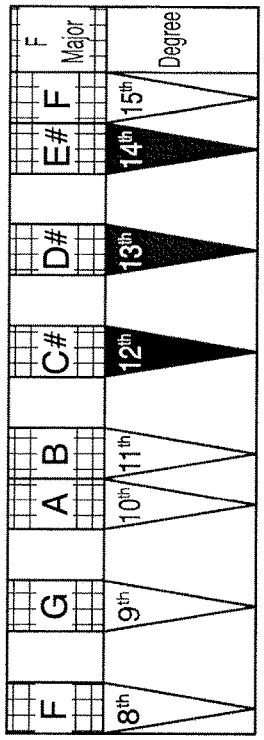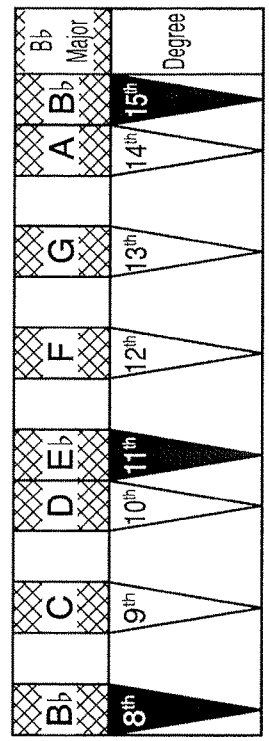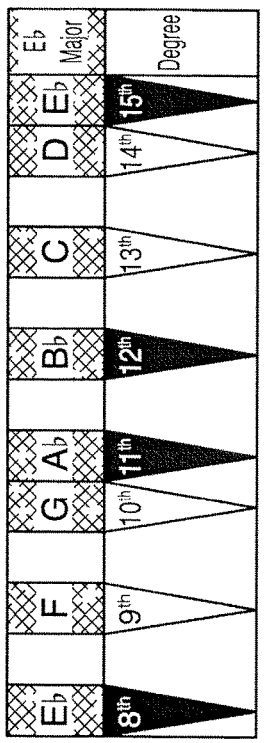
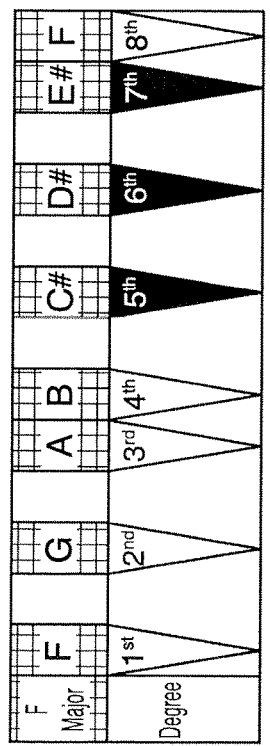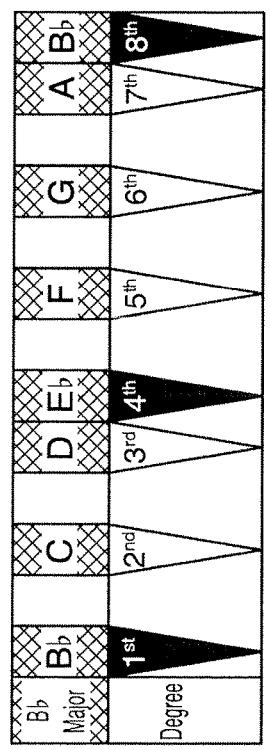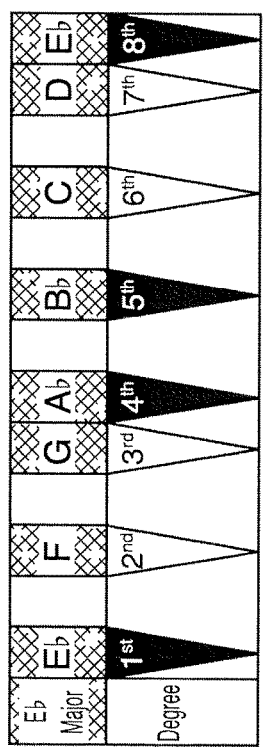
FIG. 4G  FIG. 4H  FIG. 4I

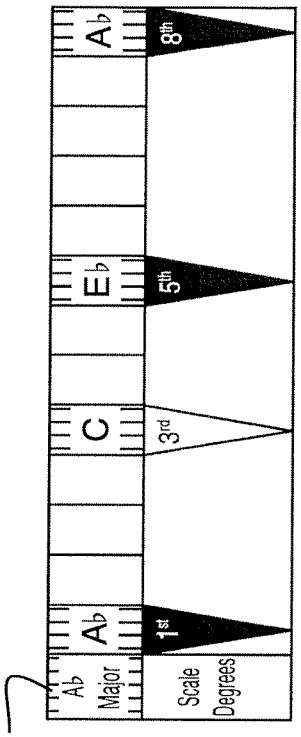
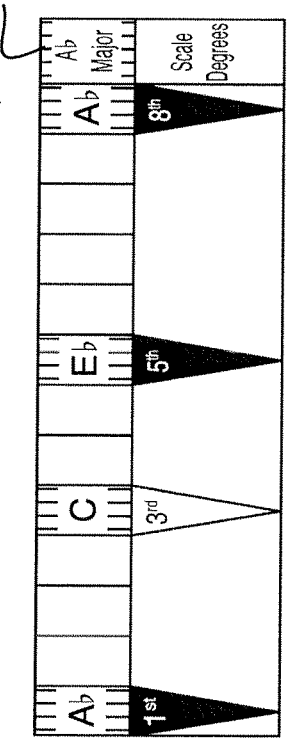
FIG. 5A
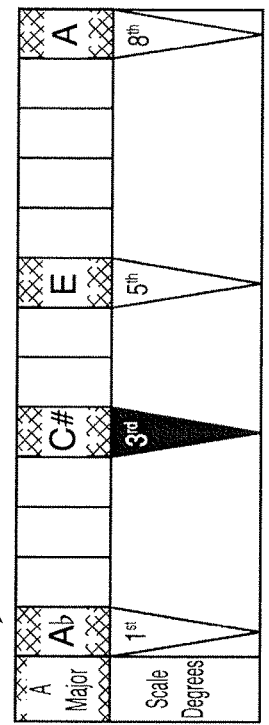
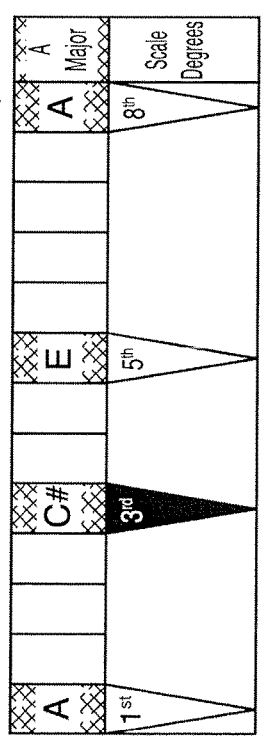
FIG. 5B
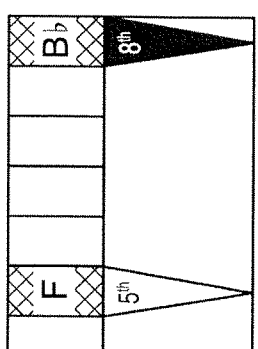
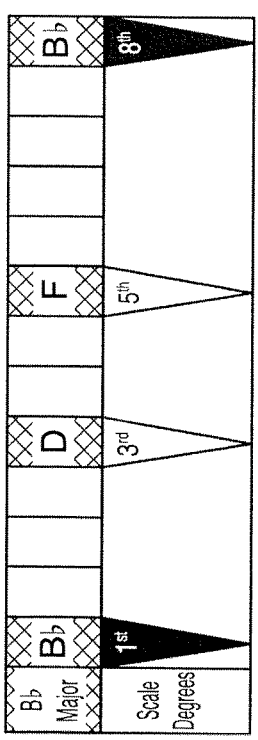
FIG. 5C

FIG. 7
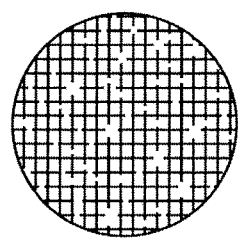 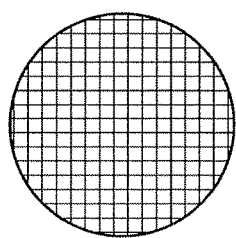 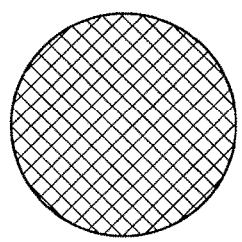 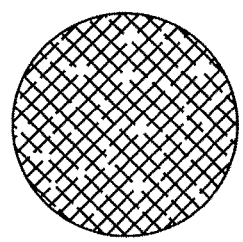
Yellow / Yellowish Orange / Orange / Reddish Orange
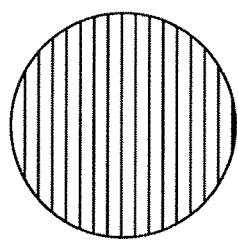 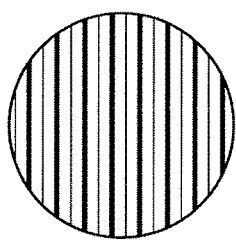 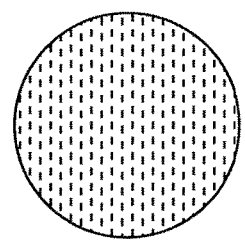 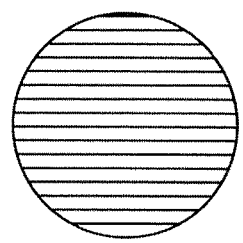
Red / Purple / Light Blue / Darker Blue
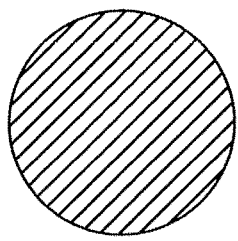 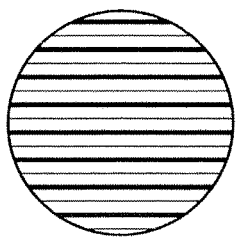 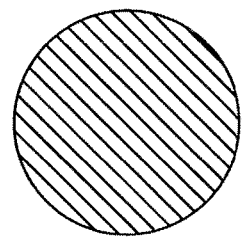 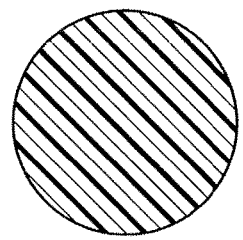
Bright Blue / Bluish Green / Dark Green / Light Green

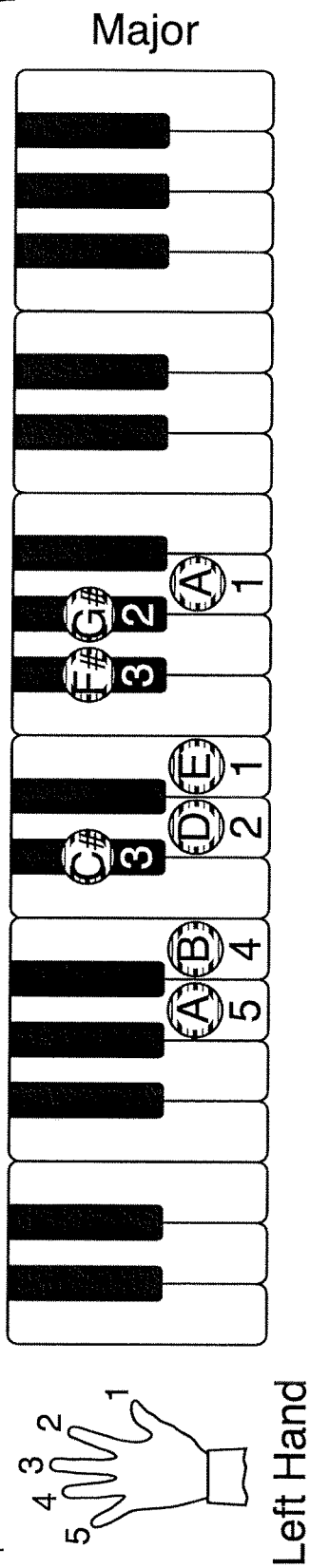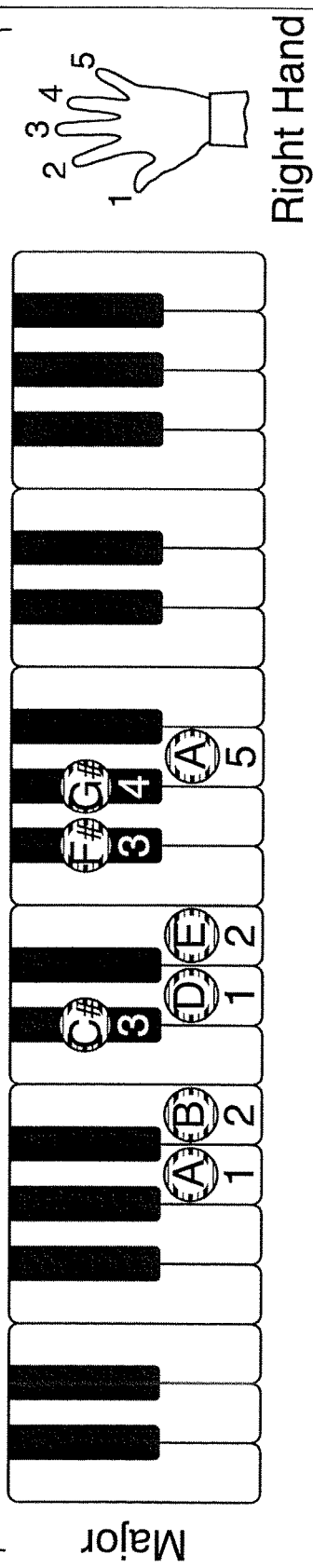

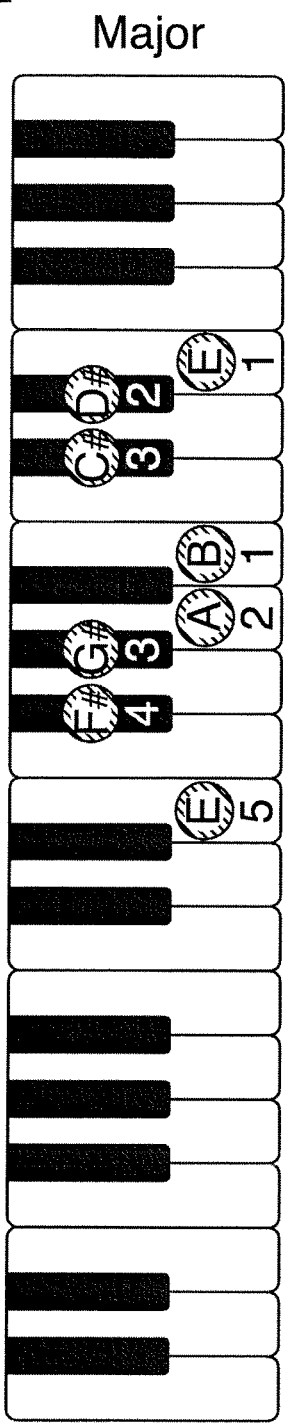
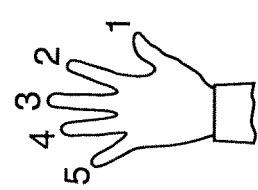
FIG. 14A — Left Hand, Major
FIG. 14B — Right Hand, Major

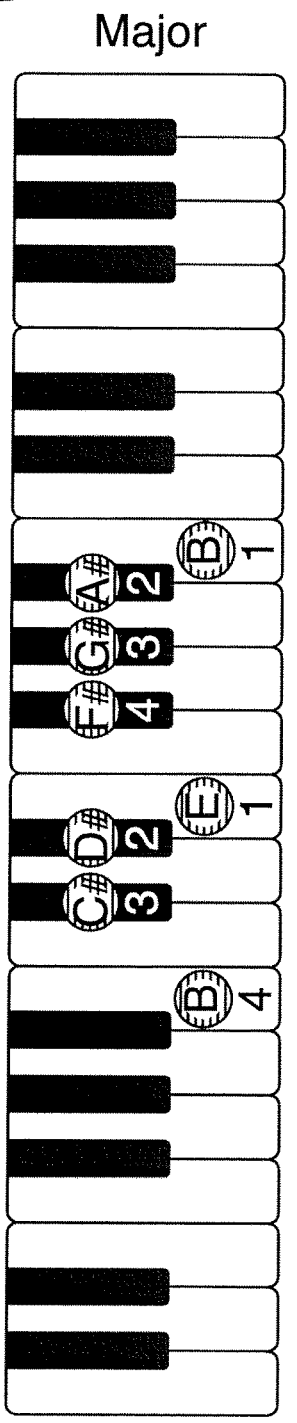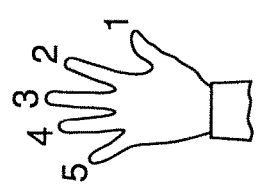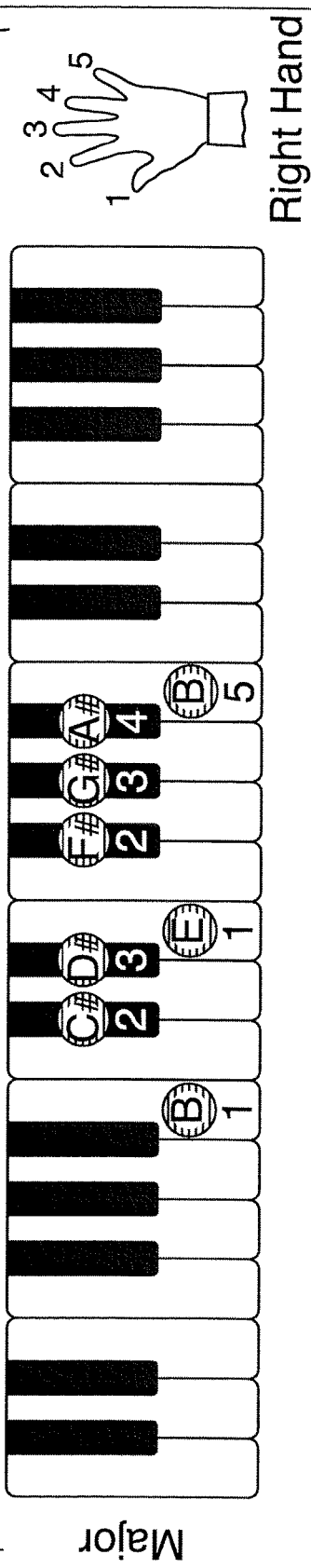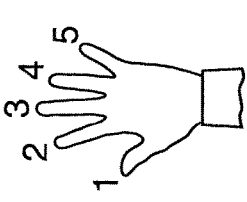
FIG. 15A  FIG. 15B

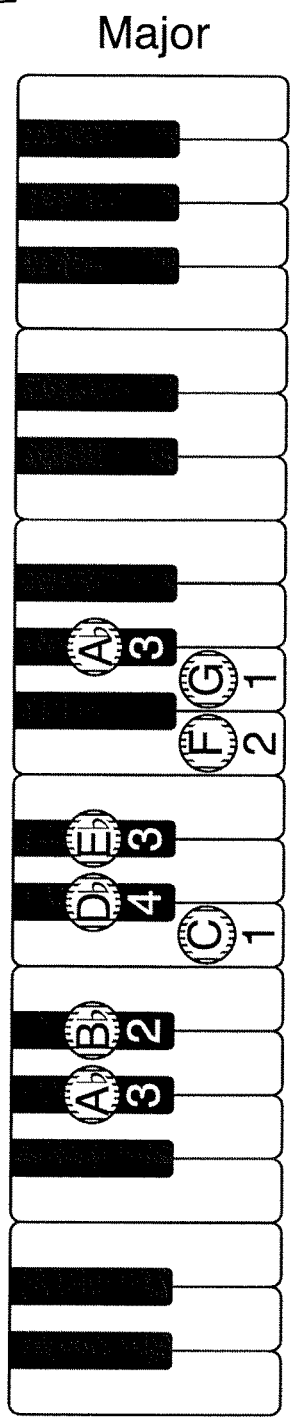
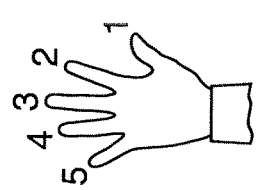
*FIG. 19A*
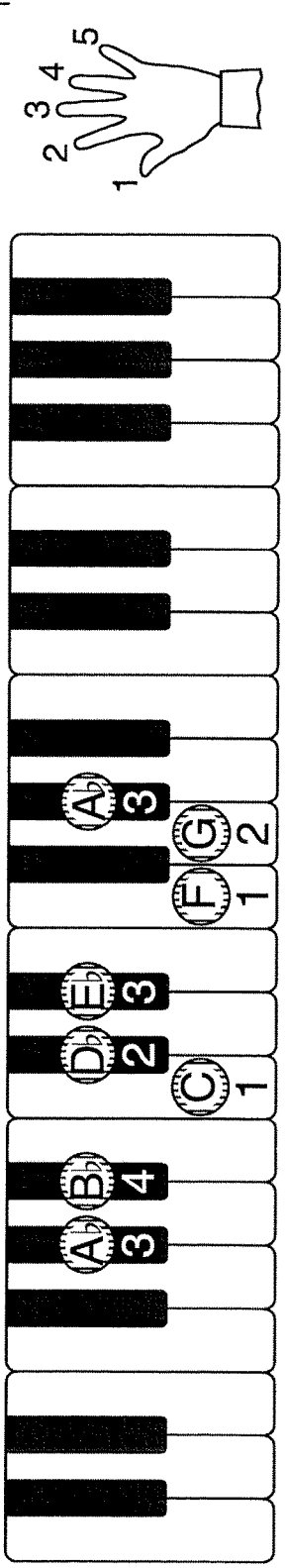
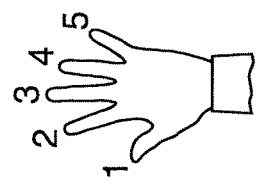
*FIG. 19B*

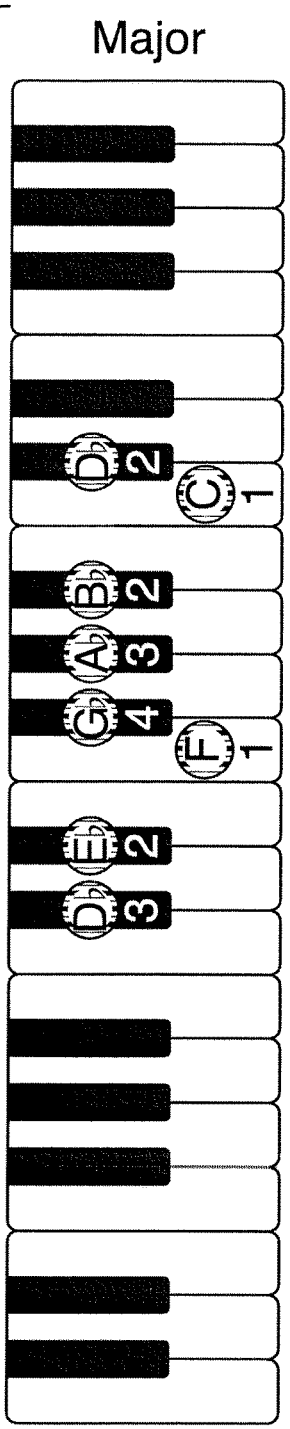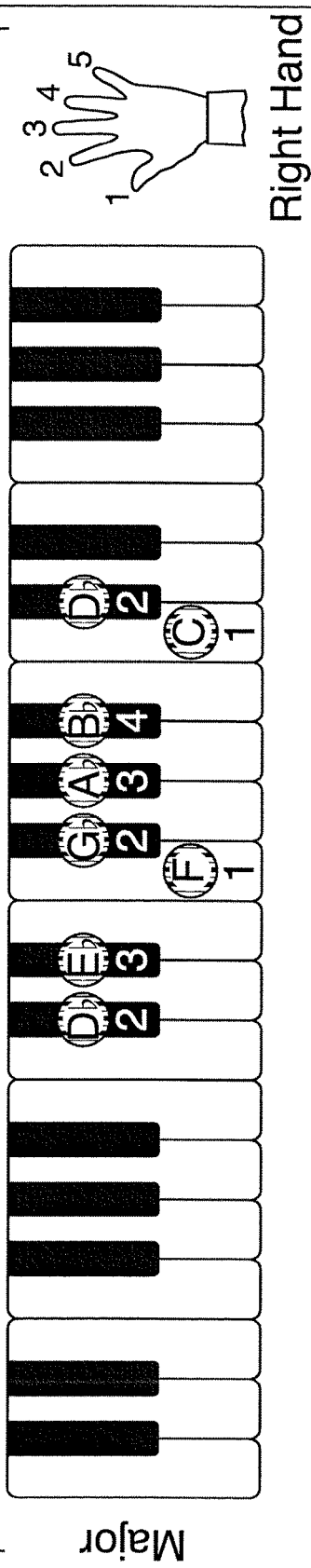
FIG. 20A
FIG. 20B

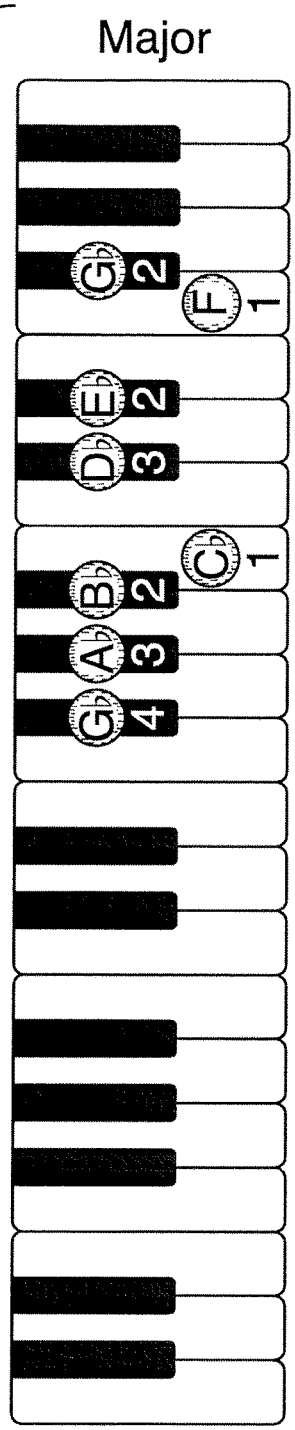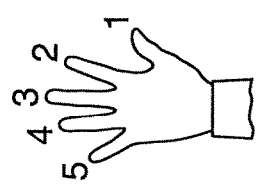
FIG. 21A
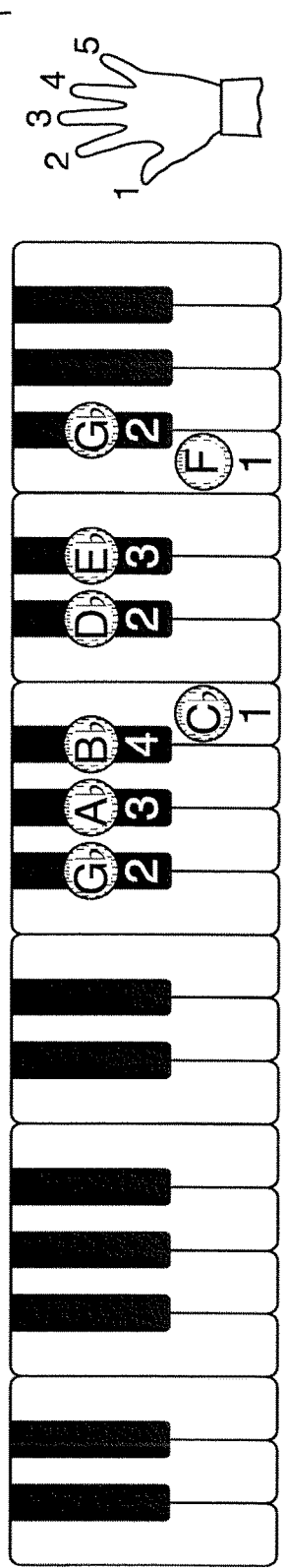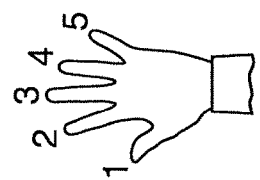
FIG. 21B

US 10,930,170 B1

PIANO CARDS MUSIC THEORY TEACHING METHOD AND APPARATUS

CROSS-REFERENCE TO RELATED PATENTS

This U.S. patent application is a Continuation-In-Part of U.S. application Ser. No. 15/867,962 filed Jan. 11, 2018.

CLAIM OF PRIORITY

This application claims the benefit of U.S. Provisional Application No. 62/449,630, filed Jan. 24, 2017.

FIELD OF THE INVENTION

The present invention relates to music teaching methods. More particularly, the present invention relates to piano teaching template cards showing fingering, music theory and chords.

BACKGROUND OF THE INVENTION

Piano teaching apparatus have been created since the piano was invented. Many of them are over complicated and difficult for the unindoctrinated student and novice. In U.S. Pat. No. 7,897,861 B2 DeLong, et al. attempt to solve complications in piano/keyboard instruction by disclosing guide templates for piano keyboard scale fingering for left and right hands and methods of using the guide templates in order to simplify learning the correct fingering sequences of scale variations. But DeLong does not suggest an easy way for the uninitiated and unindoctrinated student to place the template in its proper position. Further, DeLong's templates lack instructional information important to music theory learning. DeLong's plates have no built in feature to align them with a keyboard if moved or unaligned by wind, mistake or other force.

SUMMARY OF THE INVENTION

An advantage of the present invention is that it teaches music theory to the novice.

Another advantage of the present invention is that the music cards can only be aligned properly if black and white indicators are matched to corresponding keys.

Another advantage of the present invention is that it is easy to align on a piano.

Another advantage of the present invention is that it has piano cards with a piano diagram in the background.

Another advantage of the present invention is that it may be used for fingering practice without a keyboard.

Another advantage of the present invention is that it shows all piano notes in relation to music notation.

Another advantage of the present invention is that it easily fits on the nameboard rail of a standard upright piano.

Another advantage of the present invention is that the piano cards may be used with the music wheel to further understand the theory behind the cards.

Briefly and basically in accordance with the present invention there is provided a method of teaching piano playing and music theory comprising piano cards. These piano cards are placed above piano keys of a piano or other keyboard designating keys to be played in a specific scale. Black and white triangles on these piano cards designate ebony and ivory keys to be played and can only be placed on a keyboard correctly if aligning white and black triangles with ebony and ivory keys. Triangles designate fingers to be used on fingering cards by way of numbers designating fingers. On music theory cards numbers inside triangles designate scale degrees. On chord cards numbers designate degrees to be played. This music teaching system further comprises a music wheel that has been color coded designating the key a scale is in. This color coding corresponds to a color code on each card. A chord formula sheet is also included designating how to make chords with the scales learned thru the system.

Another form of piano cards contain a pictured keyboard on the cards. These are called piano keyboard cards. These keyboard piano cards have no triangles but have note indicators on keys to be played. Also on the pictured keys are fingering numbers showing the finger to be played. These piano keyboard cards have several varieties including scale keyboard cards, chord keyboard cards and fingering keyboard cards. These piano keyboard cards are used the same way as piano cards with triangle indicators and can be used on their own without a piano. Also included is a music notation sheet and fully labeled piano sheet. When used in conjunction these sheets' notes may line up together. Also included is a fully combined piano sheet combining the information of the scale note sheet and the piano.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities.

FIG. 2B is a top view of fingering card instruction/alignment card.

FIG. 4 A is a top view of a theory card doublet in the key of C.

FIG. 4 B is a top view of a theory card doublet in the key of G.

FIG. 4 C is a top view of a theory card doublet in the key of D.

FIG. 4 D is a top view of a theory card doublet in the key of A.

FIG. 4 E is a top view of a theory card doublet in the key of E.

FIG. 4 F is a top view of a theory card doublet in the key of B.

FIG. 4 G is a top view of a theory card doublet in the key of F.

FIG. 4 H is a top view of a theory card doublet in the key of E♭.

FIG. 4 I is a top view of a theory card doublet in the key of B♭.

FIG. 4 J is a top view of a theory card doublet in the key of A♭.

FIG. 4 K is a top view of a theory card doublet in the key of D♭.

FIG. 4 L is a top view of a theory card doublet in the key of G♭.

FIG. 5(A-J) is a top view of group of chord cards and some chord card doublets.

FIG. 5A is a top view of a fingering card doublet in the key of A♭.

FIG. 5B is a top view of a fingering card doublet in the key of A.

FIG. 5C is a top view of a fingering card in the key of B♭.

FIG. 7 is a color key.

FIG. 13A is a top view of a major scale left handed piano keyboard card in the key of A.

FIG. 13B is a top view of a major scale right handed piano keyboard card in the key of A.

FIG. 14A is a top view of a major scale left handed piano keyboard card in the key of E.

FIG. 14B is a top view of a major scale right handed piano keyboard card in the key of E.

FIG. 15A is a top view of a major scale left handed piano keyboard card in the key of B.

FIG. 15B is a top view of a major scale right handed piano keyboard card in the key of B.

FIG. 19A is a top view of a major scale left handed piano keyboard card in the key of A♭.

FIG. 19B is a top view of a major scale right handed piano keyboard card in the key of A♭.

FIG. 20A is a top view of a major scale left handed piano keyboard card in the key of D♭.

FIG. 20B is a top view of a major scale right handed piano keyboard card in the key of D♭.

FIG. 21A is a top view of a major scale left handed piano keyboard card in the key of G♭.

FIG. 21B is a top view of a major scale right handed piano keyboard card in the key of G♭.

DETAILED DESCRIPTION OF PRESENTLY PREFERRED EMBODIMENTS

Figure 1:
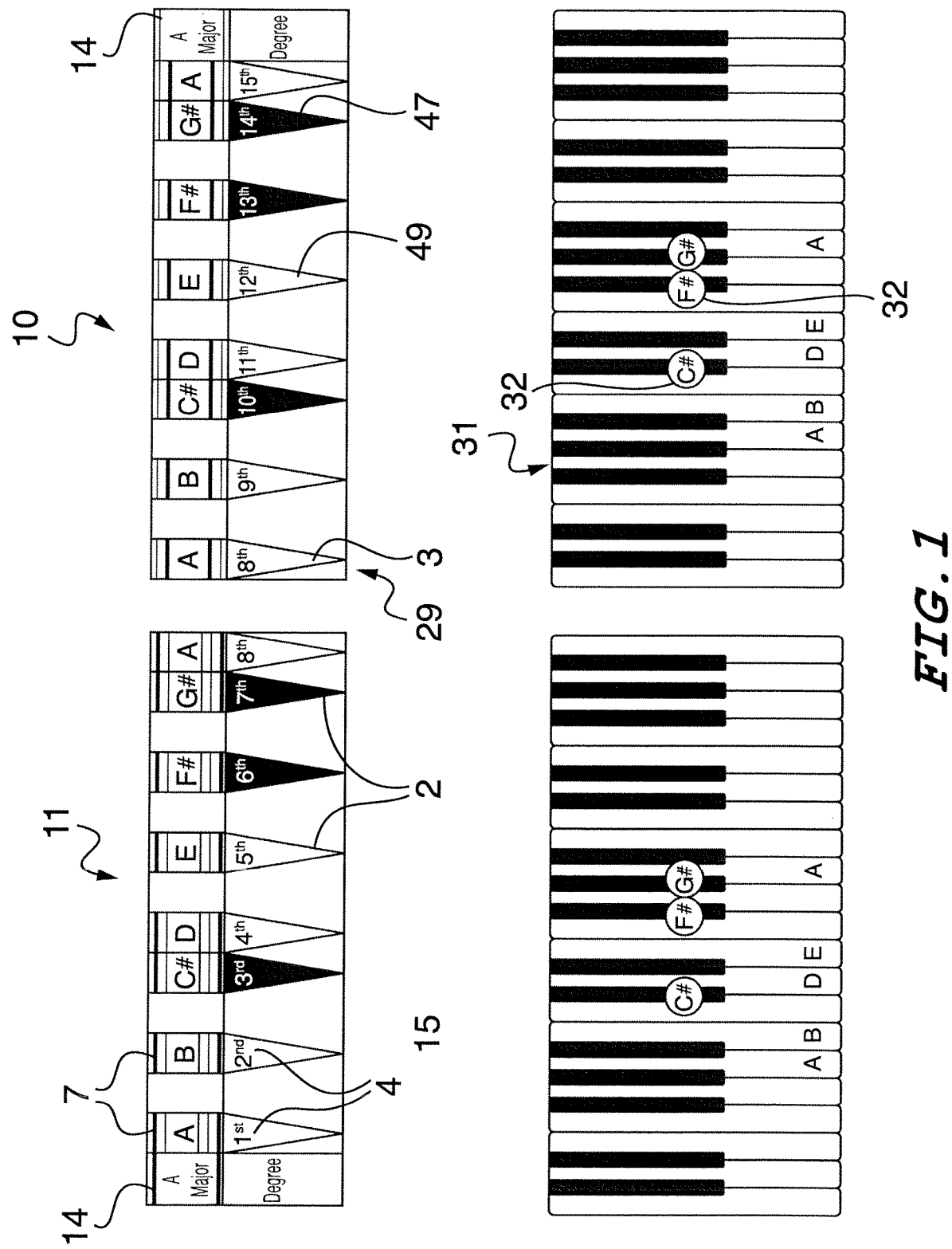
FIG. 1 is a top view of a theory card doublet above and a second side view of the same theory card doublet below.
Figure 2A:
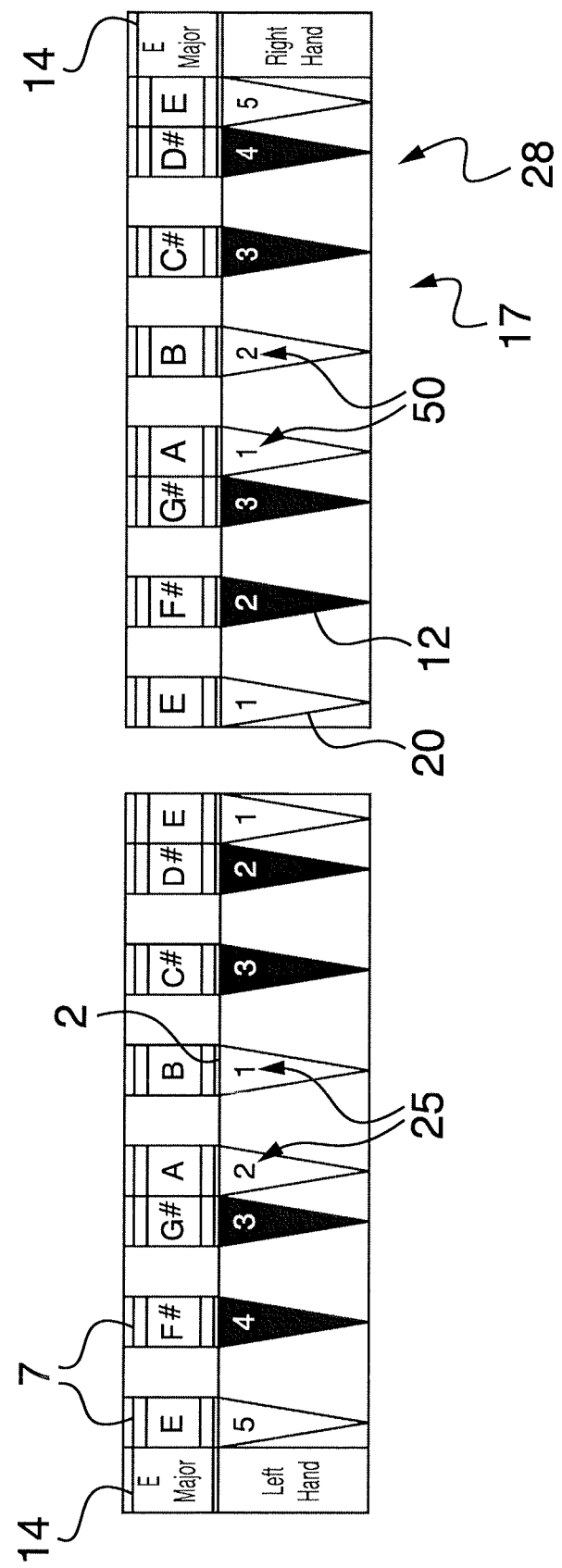
FIG. 2A is a top view of a fingering card doublet.

Referring now to the drawings in detail, wherein like numerals indicate like elements, there is shown in FIG. 1 a theory card doublet above and a second side view of the same theory card doublet below.

Theory cards are part of an Apparatus for teaching music and the piano. For the purposes of this application piano is defined as any keyboard instrument that has the same keys and note configuration as a piano. The apparatus teaches music with piano cards. These piano cards teach aspiring pianists the degrees of a scale or other musical set. Shown in FIG. 1 is a piano card. More specifically shown in FIG. 1 are theory card piano cards 15. Each theory piano card 15 contains the notes pertaining to a particular musical scale in the form of key indicators 2. FIG. 1 shows a presently preferred embodiment wherein key indicators 2 contain the form of triangles 3 pointing downwards towards the keys to be played. These triangles 3 are filled in white for ivory keys and black for ebony keys. When the key indicators 2 are colored black and white in this way 99 and aligned on a piano so that white indicators only point to white keys and black indicators point to black keys most of these piano cards can only be aligned correctly 99. If they are misaligned one or more ebony key indicators will be pointing to white keys and one or more white indicators will be pointing to black keys. Inside each triangle 3 there are degree indicator symbols 4. In FIG. 1 these degree indicator symbols 4 are in the form of alphanumeric representation, more specifically: 1st 2nd 3rd 4th 5th 6th 7th 8th and so on. Above each triangle there are note indicator symbols 7. These note indicator symbols 7 are in the form of rectangular boxes and are colored in according to a color coding scheme pertaining to the key of the scale of that particular piano card. Inside each rectangular box of note indicator symbols 7 there are alpha numeric representations of each note indicated by key indicator symbols. There are right hand and left handed piano cards. Right hand piano cards 10 are to be played by a pianist's right hand. Left hand piano cards 11 are to be played by a pianist's left hand. Musical key indicator boxes 14 are located on the right side of right handed piano cards 10 and on the left side of left handed piano cards 11. Musical key indicator boxes 14 indicate the key of the scale of that piano card.

The system has three kinds of piano cards: theory cards 15, fingering cards 17 and chord cards 19. Theory cards 15 contain key indicators 2 that have a number indicating the degree of the piano key indicated in the scale of that card. The number is inside the key indicator triangle 3. Fingering piano cards 17 have numbers, inside their key indicator triangles 25, indicating the finger to be used to play the key indicated by the key indicator. In this fingering system 23 thumb is a "1", index finger is a "2", middle finger is a "3", ring finger is a "4" and pinky finger is a "5". Chord cards 19 are similar to theory cards 15 in that they contain the degree of the key indicated by each key indicator 2 in their key indicator triangles, however, chord cards do not represent a full scale but rather only a chord. Theory piano cards 15, fingering cards 17 and chord cards 19 are currently arranged in doublets, one left handed and one right handed card. Each card in a fingering card doublet 28 and each card in a theory card doublet 29 contain the full scale indicated by its musical key indicator box 14. To play both cards consecutively each card must be aligned above the piano keys on separate octaves. Chord cards also may come in chord card doublets 30 but are representative of chords. Chords of cards are indicated in chord indicator boxes 1.

Figure 3A:
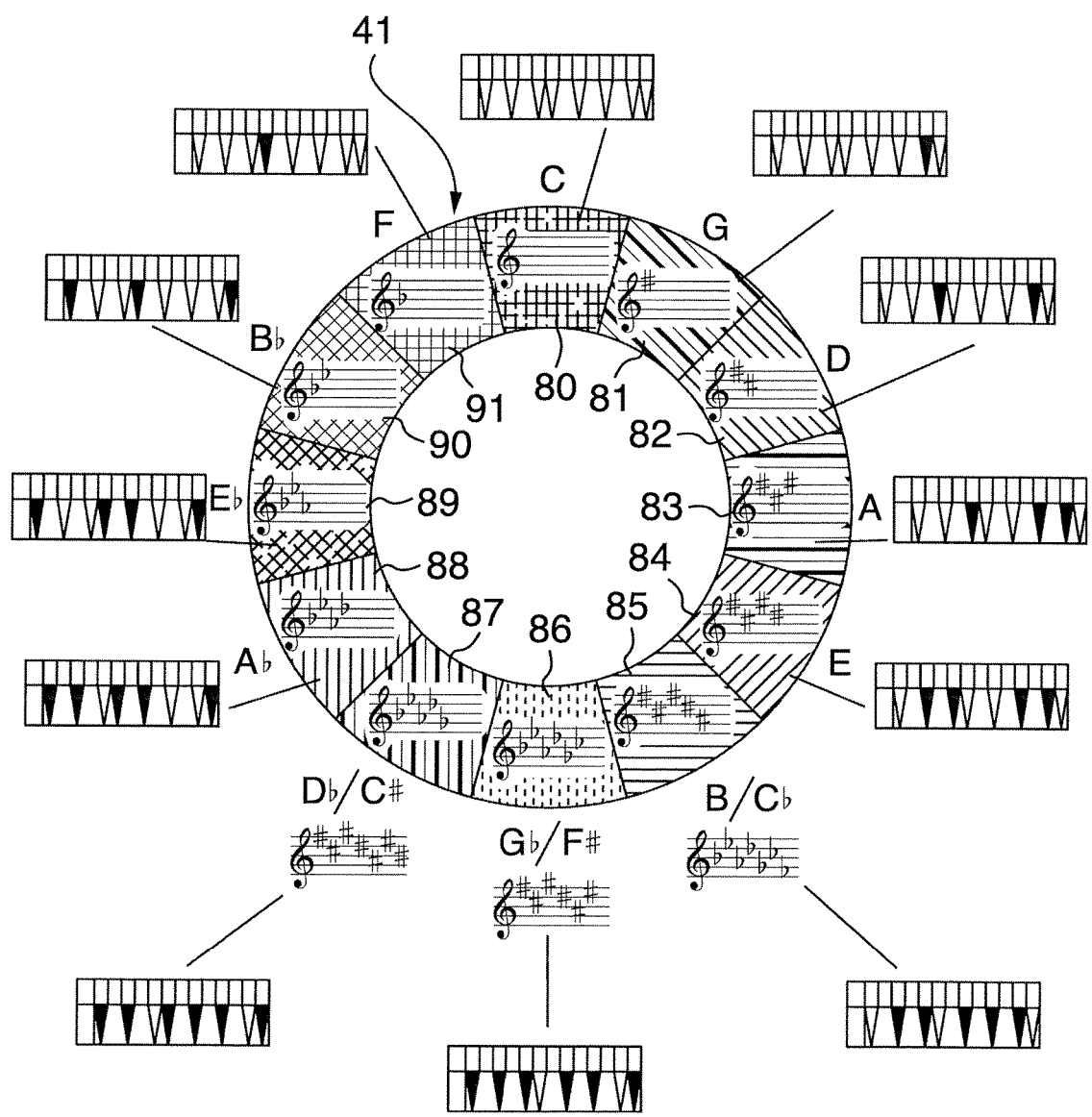
FIG. 3A is a top diagram of a music wheel with corresponding theory cards connected by lines.
Figure 3B:
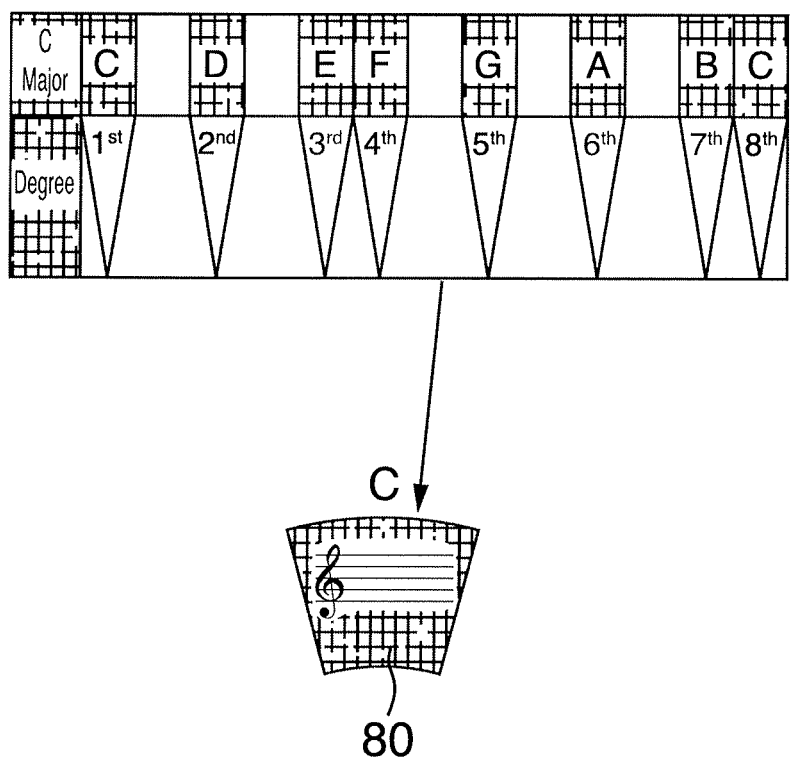
FIG. 3B is a more detailed view of one section of a music wheel with a line connecting that section's corresponding theory card.
Figure 4A:
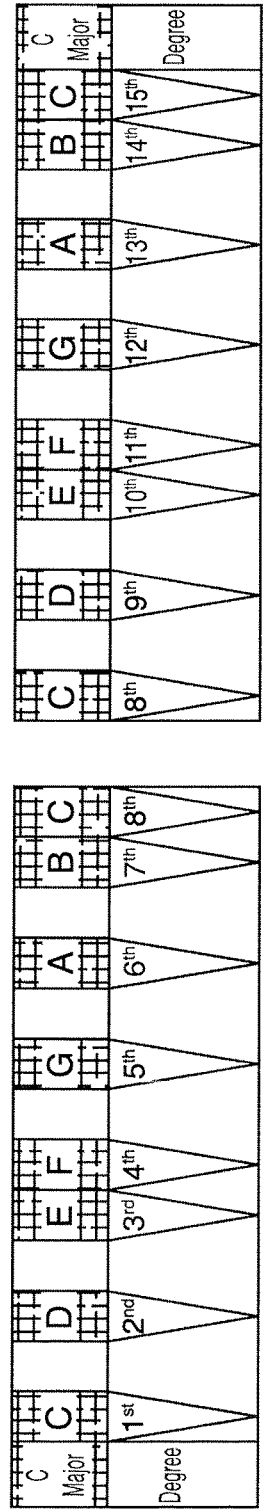
FIG. 4(A-L) is a top view of a full mode set of theory card doublets.
Figure 4B:
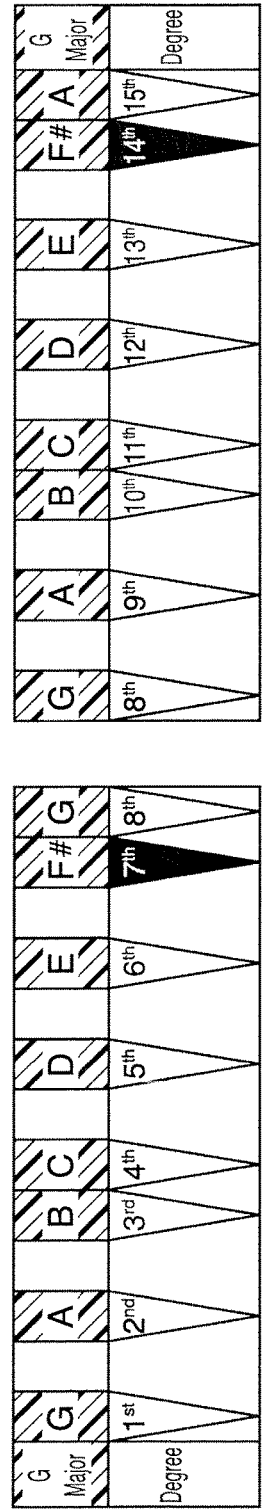
Figure 4C:
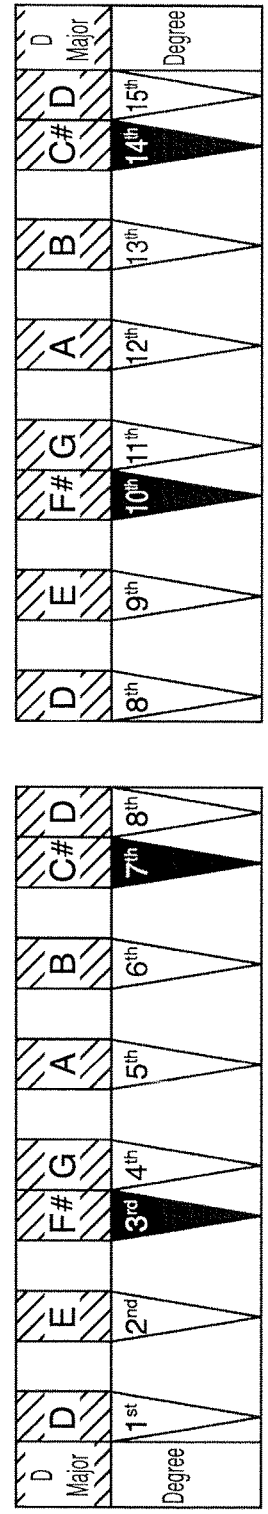
Figure 4J:
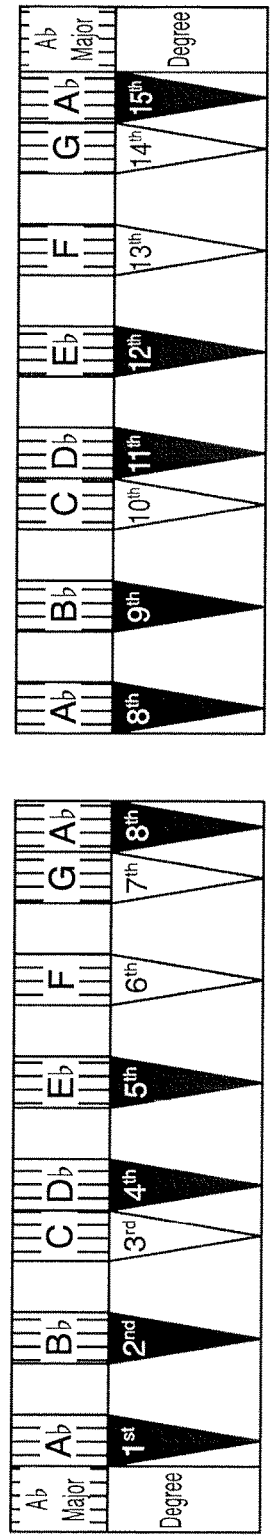
Figure 4K:
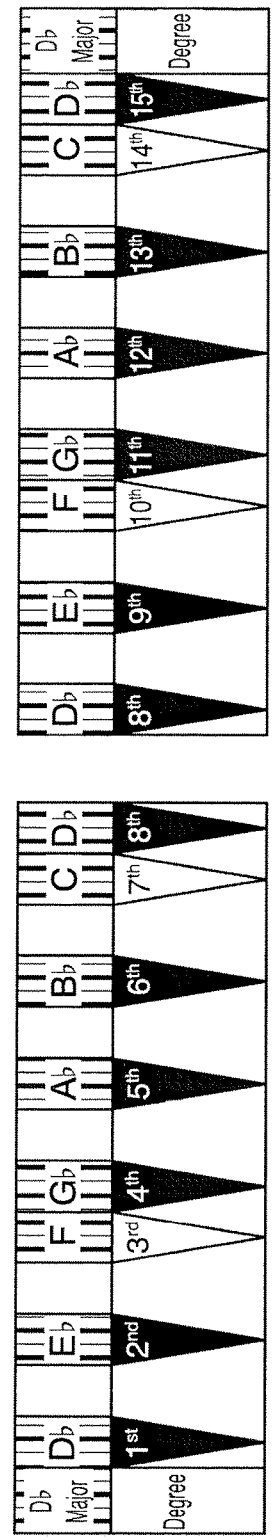
Figure 4L:
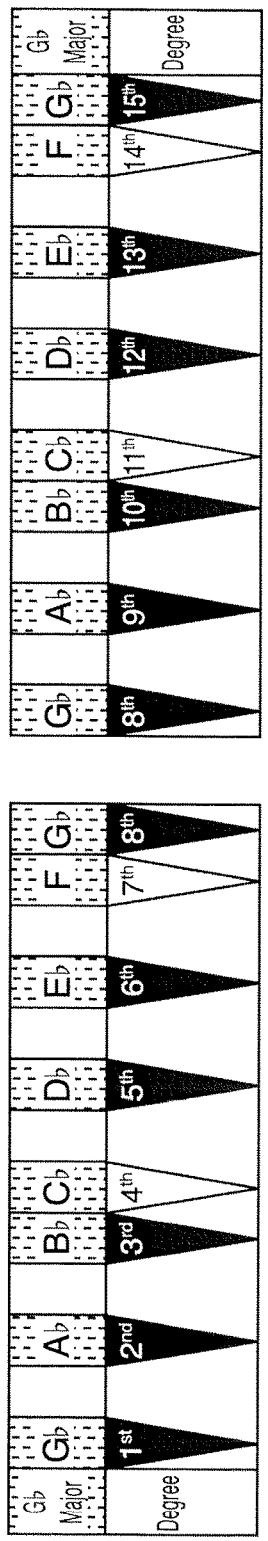
Figure 5D:
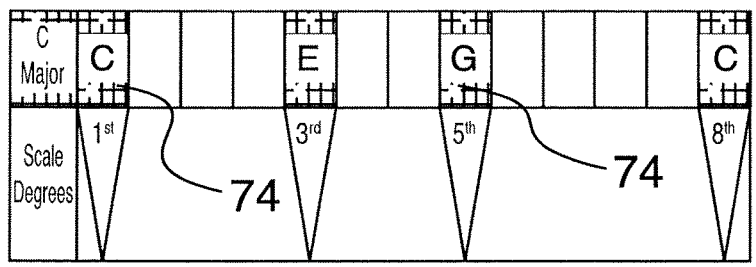
FIG. 5D is a top view of a fingering card in the key of C.
Figure 5E:
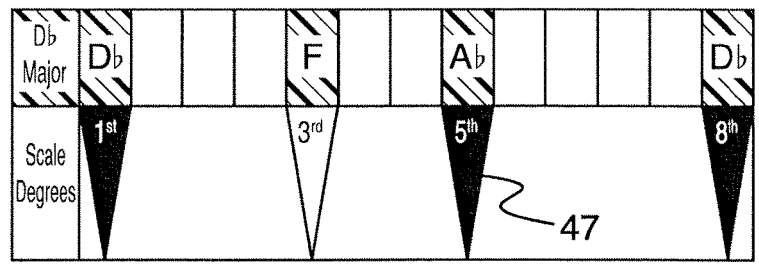
FIG. 5E is a top view of a fingering card in the key of D♭.
Figure 5F:
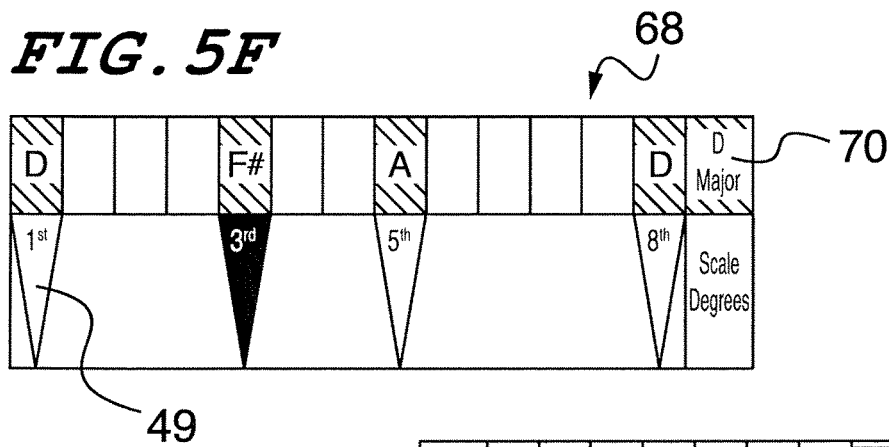
FIG. 5F is a top view of a fingering card in the key of D.
Figure 5G:
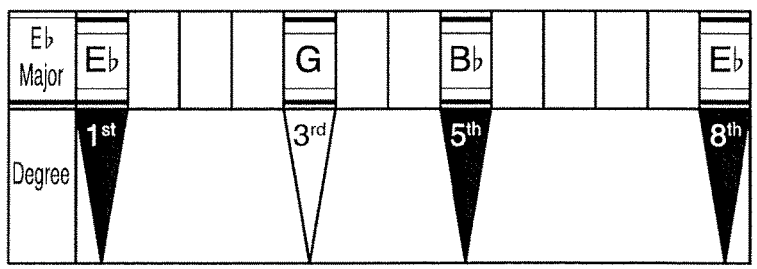
FIG. 5G is a top view of a fingering card in the key of E♭.
Figure 5H:
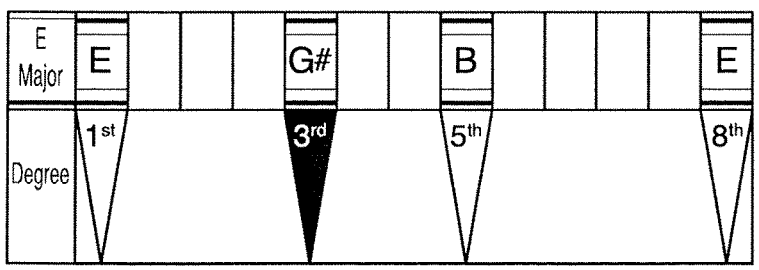
FIG. 5H is a top view of a fingering card in the key of E.
Figure 5I:
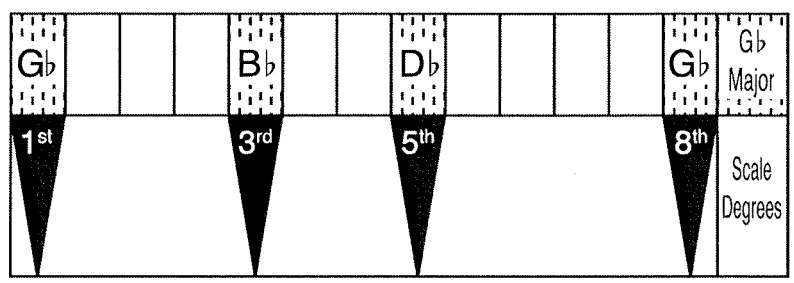
FIG. 5I is a top view of a fingering card in the key of G♭.
Figure 5J:
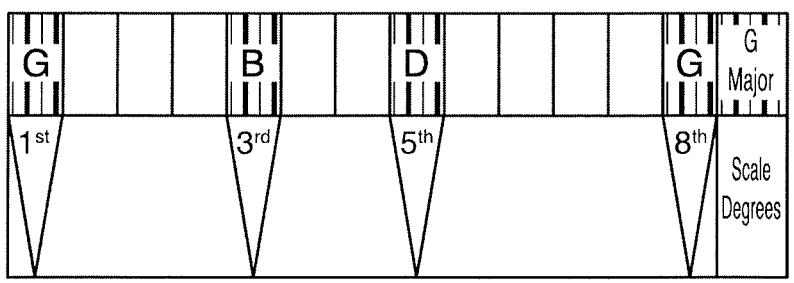
FIG. 5J is a top view of a fingering card in the key of G.
Figure 6A:
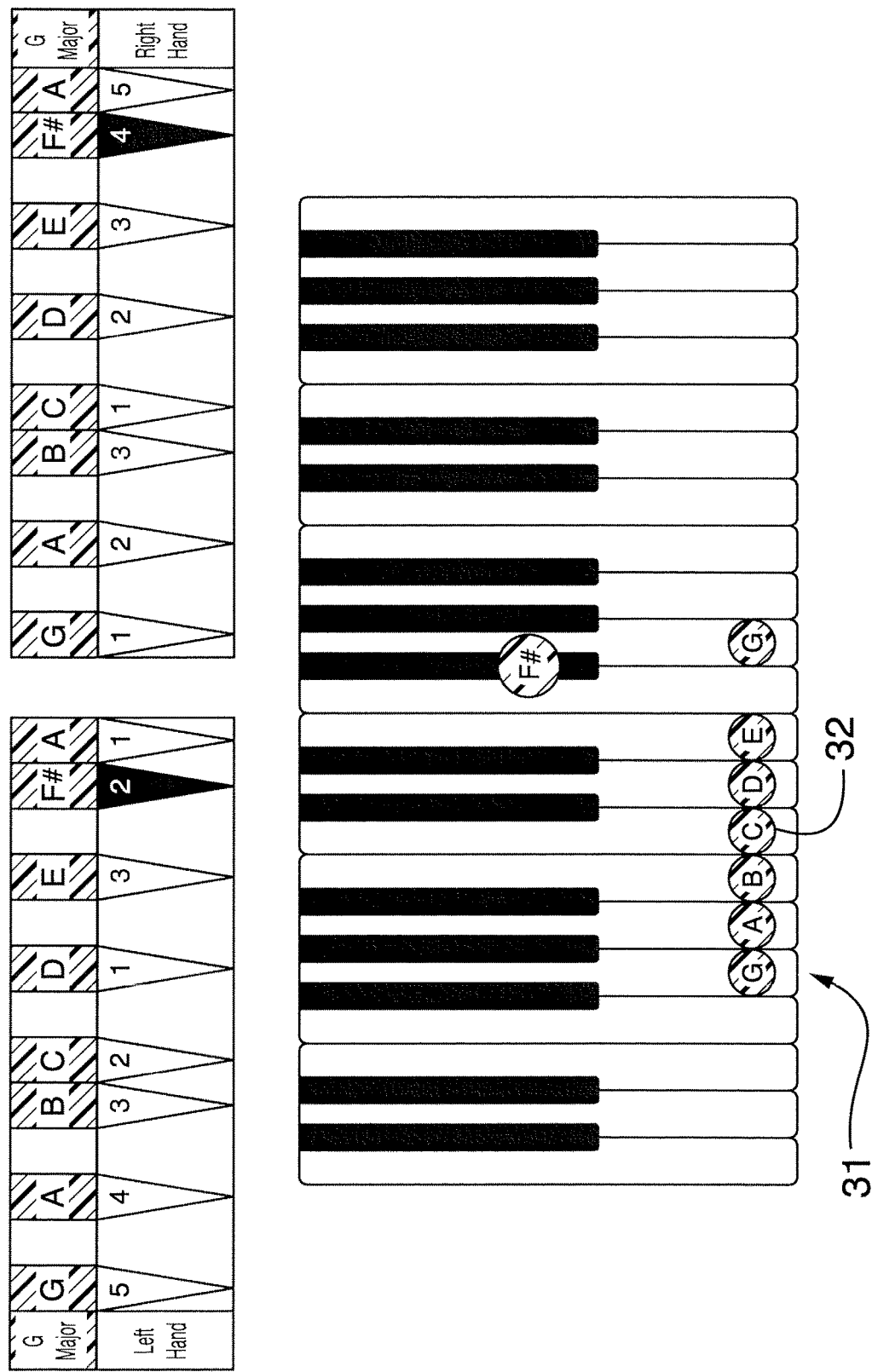
FIG. 6A is a top view of one left handed and one right handed fingering card and one second side of a fingering card.
Figure 6B:
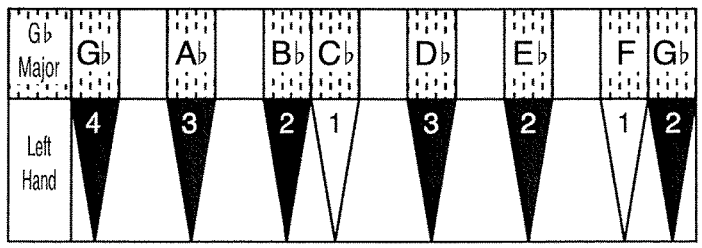
FIG. 6B is a top view of a fingering card.
Figure 6C:
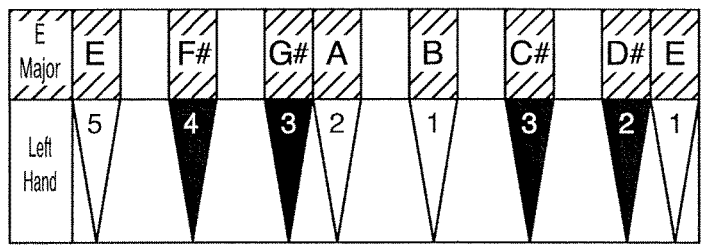
FIG. 6C is a top view of a fingering card.
Figure 6D:
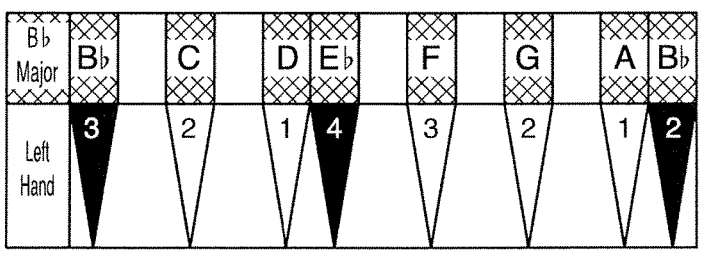
FIG. 6D is a top view of a fingering card.
Figure 6E:
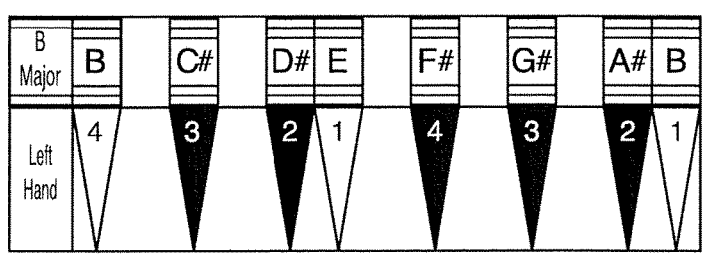
FIG. 6E is a top view of a fingering card.
Figure 6F:
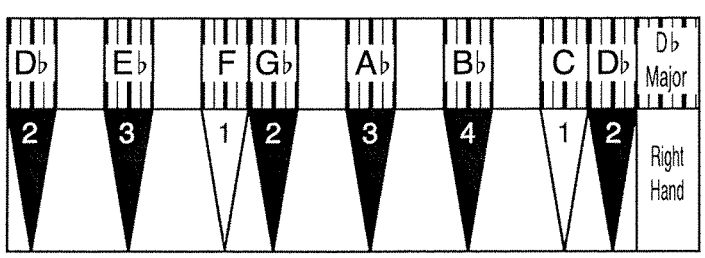
FIG. 6F is a top view of a fingering card.
Figure 6G:
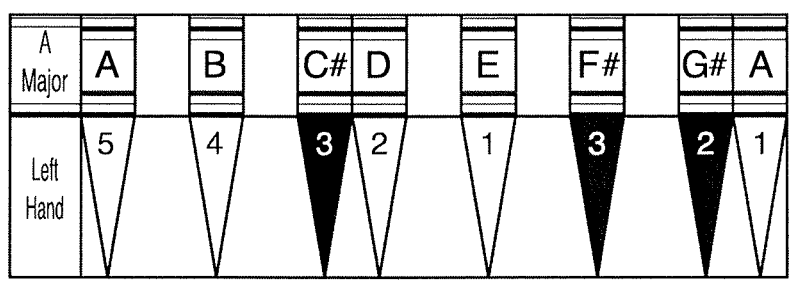
FIG. 6G is a top view of a fingering card.
Figure 6H:
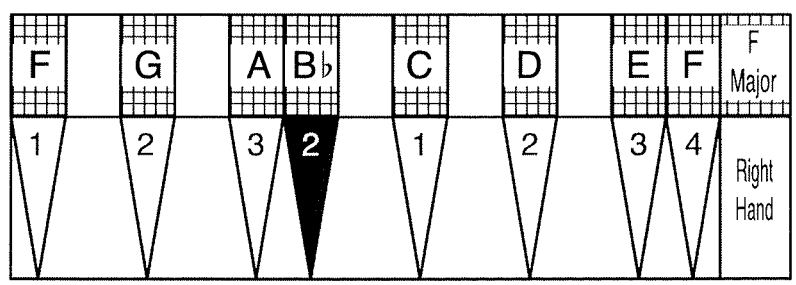
FIG. 6H is a top view of a fingering card.
Figure 8:
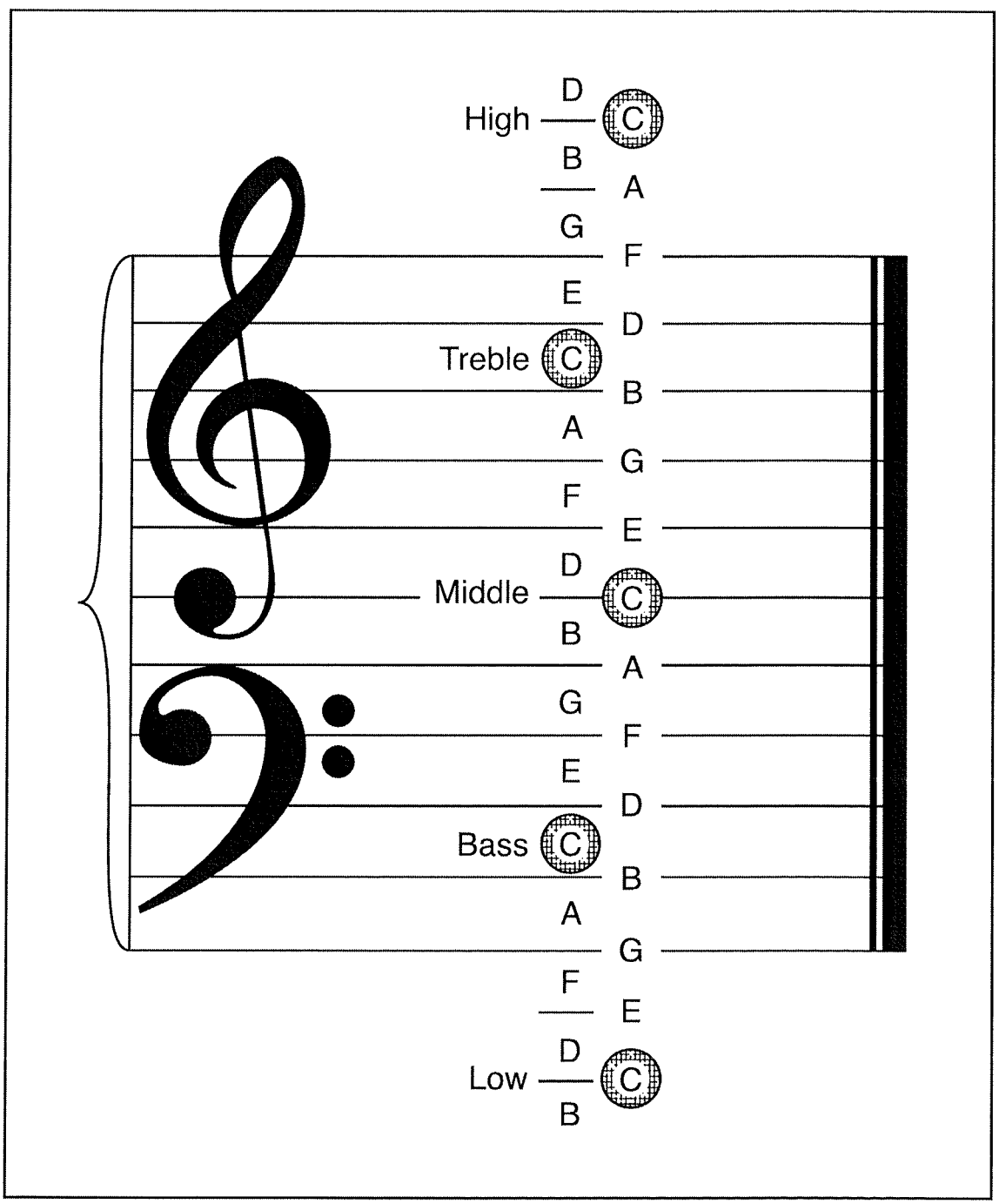
FIG. 8 is a top view of a music notation sheet.
Figure 9:
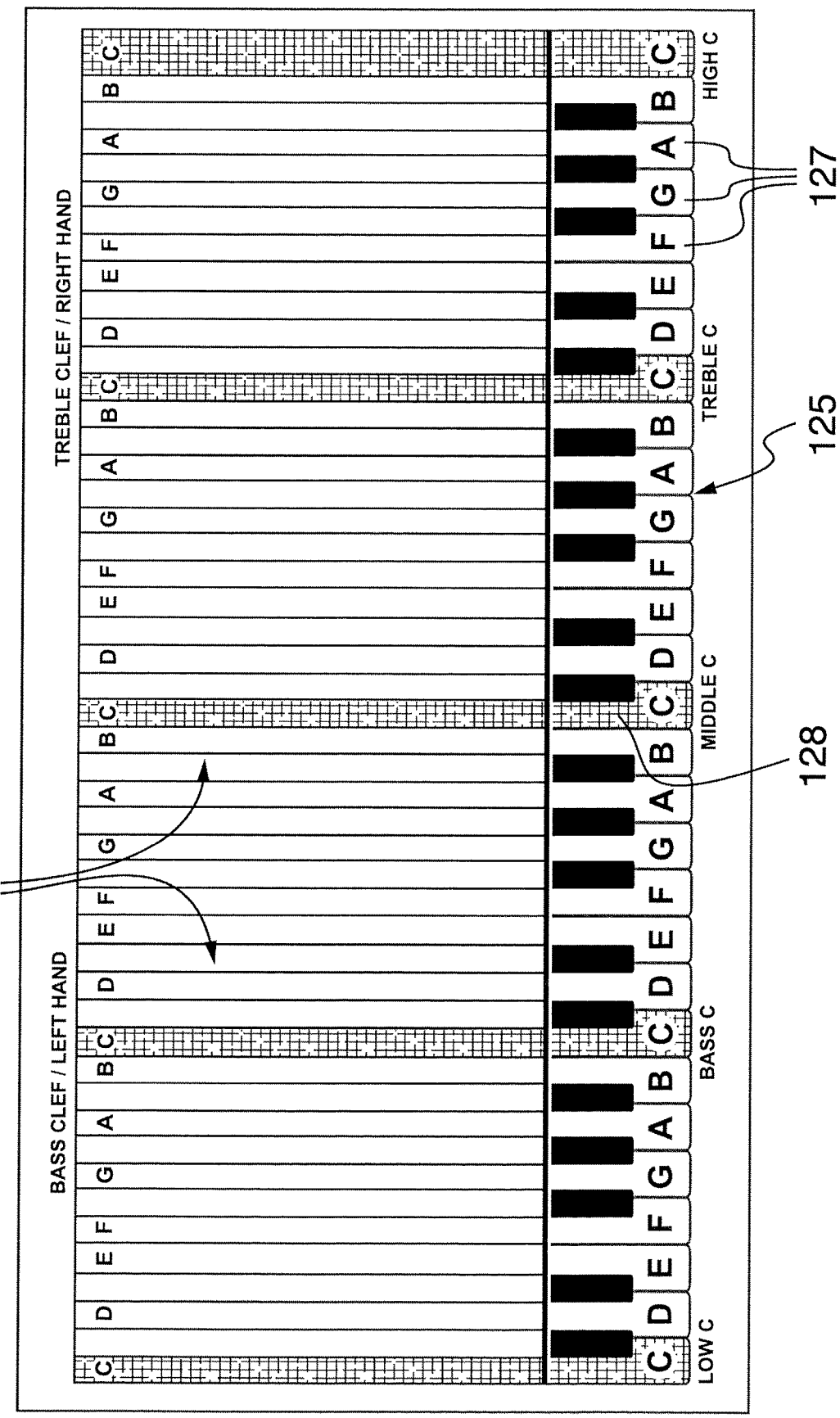
FIG. 9 is a top view of a fully labeled piano sheet.
Figure 10A:
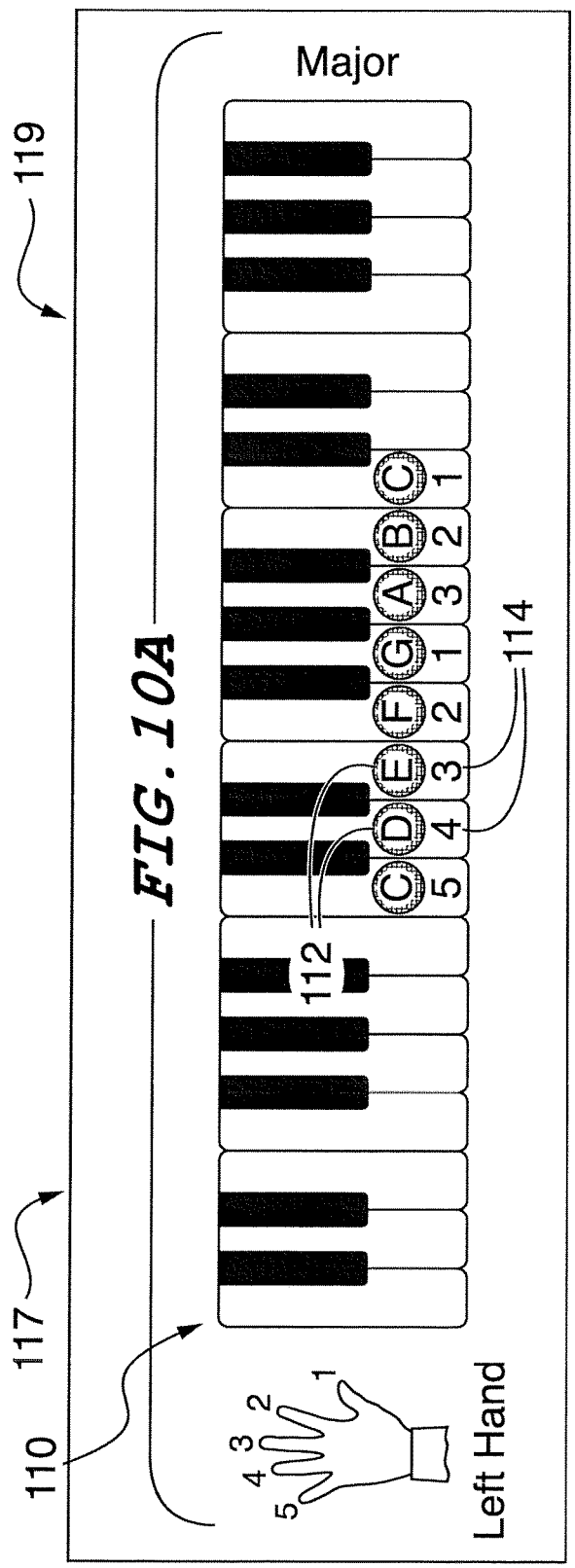
FIG. 10A is a top view of a major scale left handed piano keyboard card in the key of C.
Figure 10B:
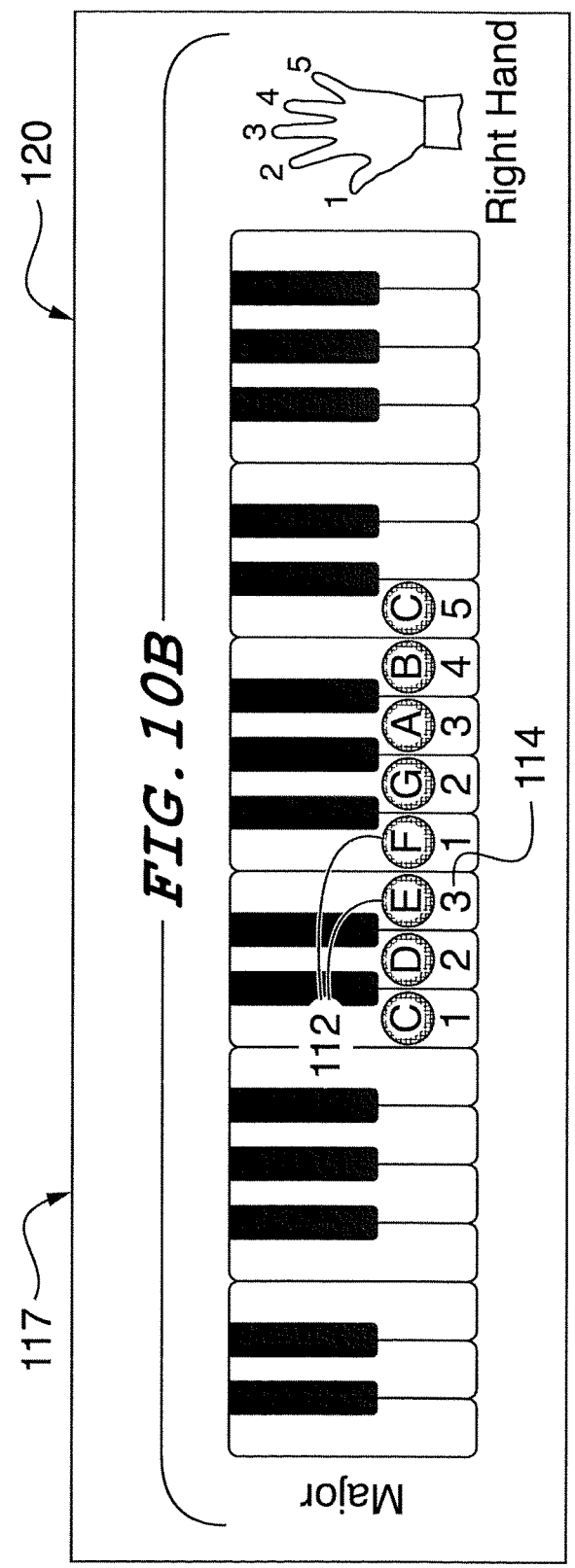
FIG. 10 B is a top view of a major scale right handed piano keyboard card in the key of C.
Figure 11A:
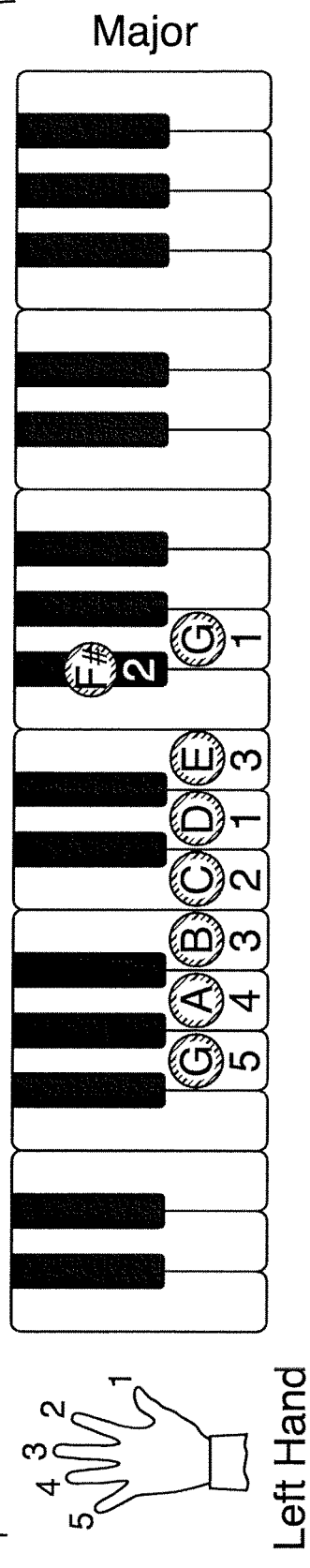
FIG. 11 A is a top view of a major scale left handed piano keyboard card in the key of G.
FIG. 11B is a top view of a major scale right handed piano keyboard card in the key of G.
Figure 11B:
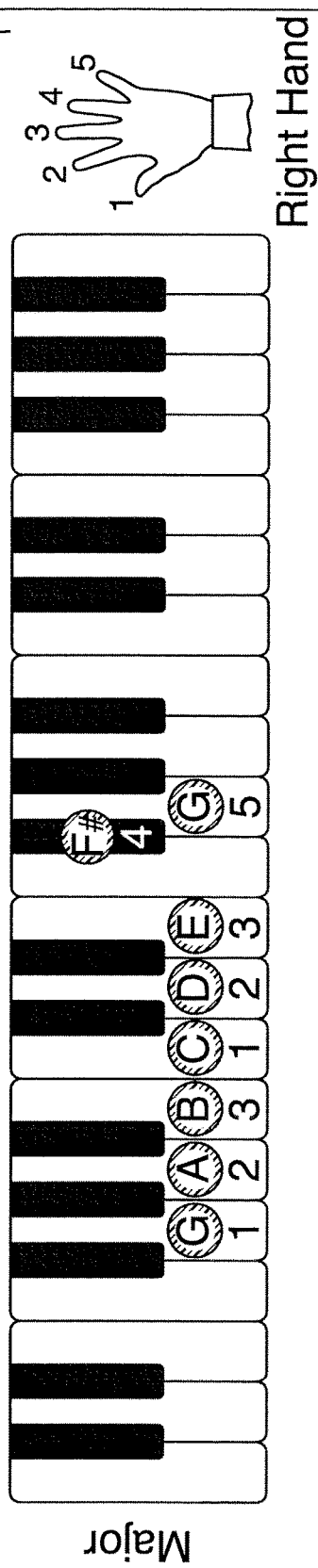
Figure 12A:
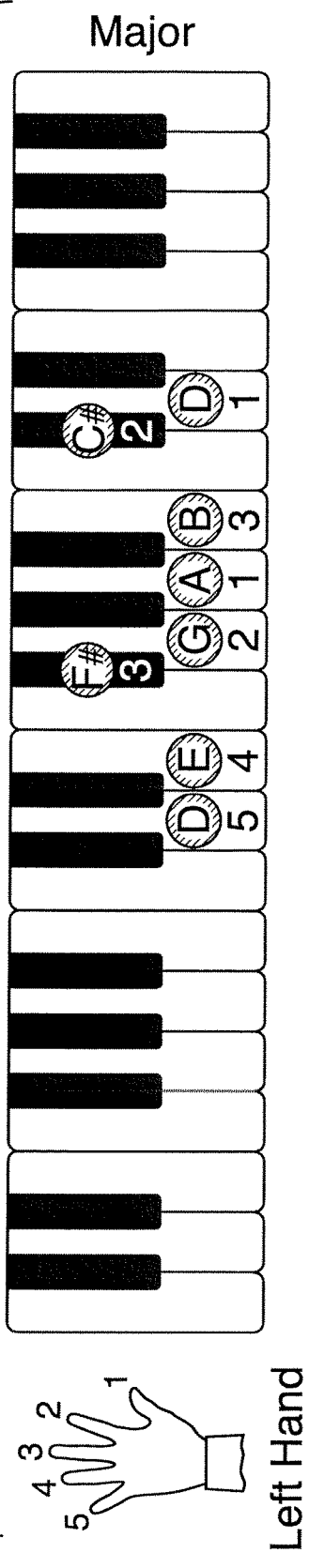
FIG. 12A is a top view of a major scale left handed piano keyboard card in the key of D.
Figure 12B:
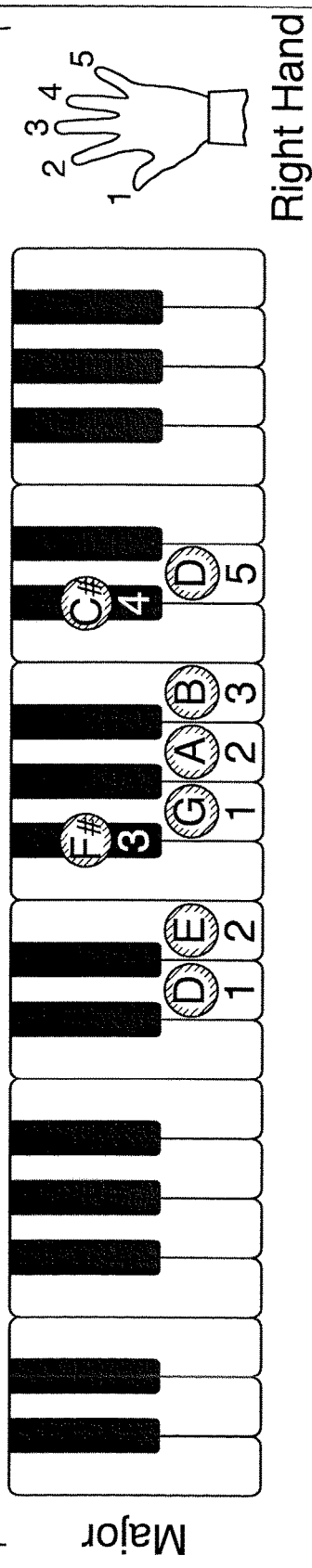
FIG. 12B is a top view of a major scale right handed piano keyboard card in the key of D.
Figure 16A:
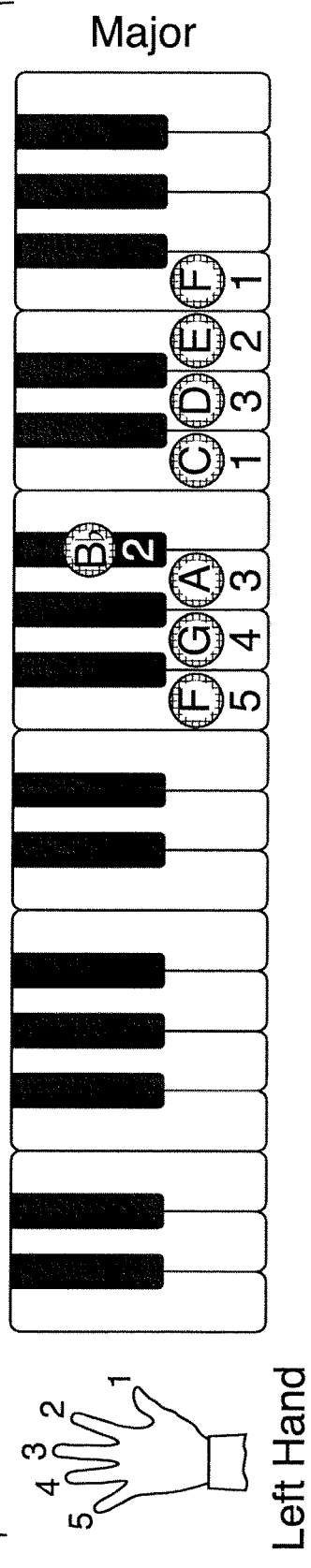
FIG. 16A is a top view of a major scale left handed piano keyboard card in the key of F.
Figure 16B:
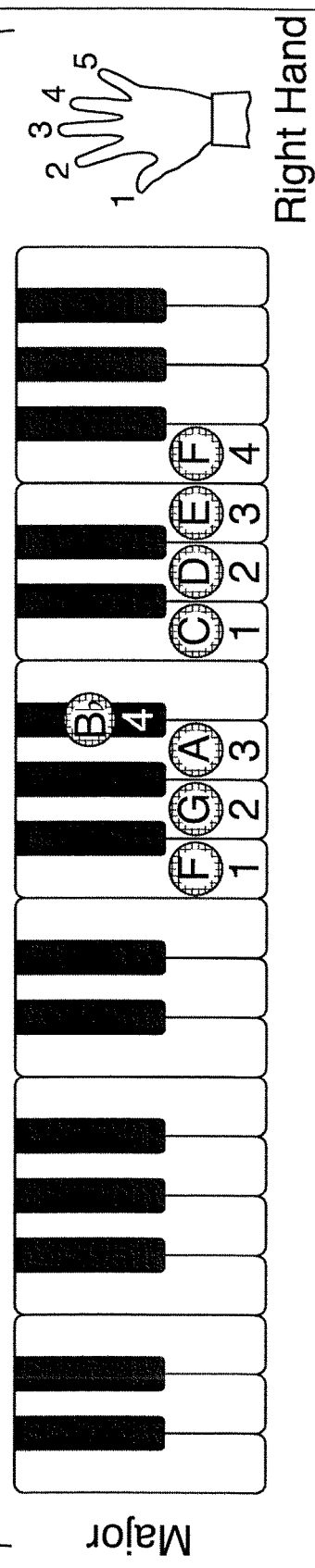
FIG. 16B is a top view of a major scale right handed piano keyboard card in the key of F.
Figure 17A:
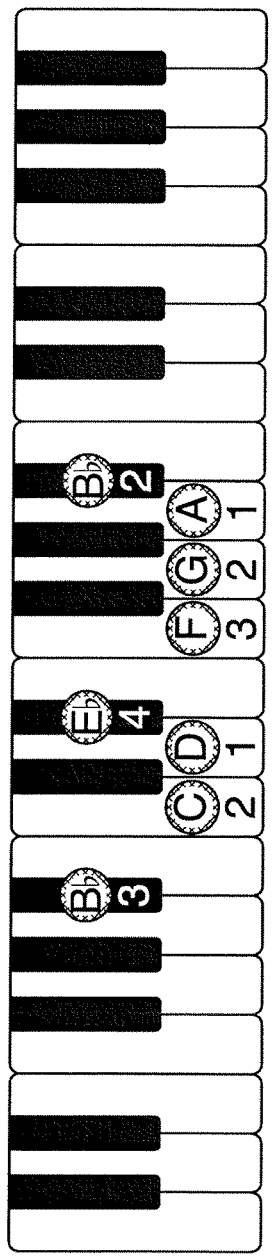
FIG. 17A is a top view of a major scale left handed piano keyboard card in the key of B♭.
Figure 17B:
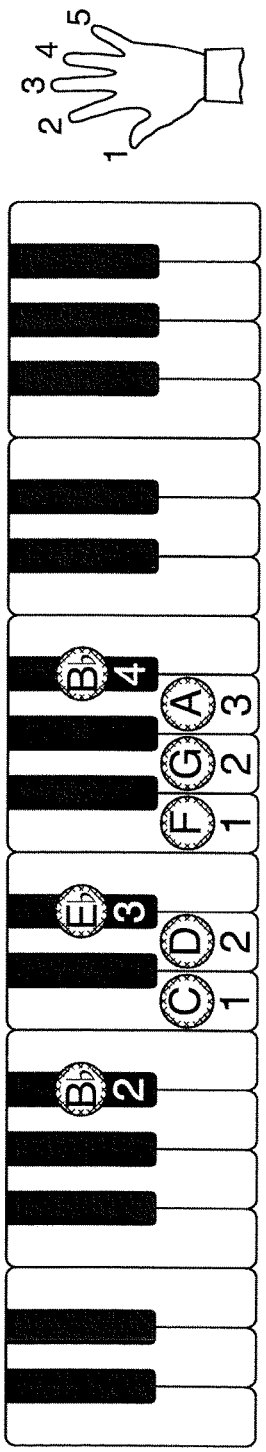
FIG. 17B is a top view of a major scale right handed piano keyboard card in the key of B♭.
Figure 18A:
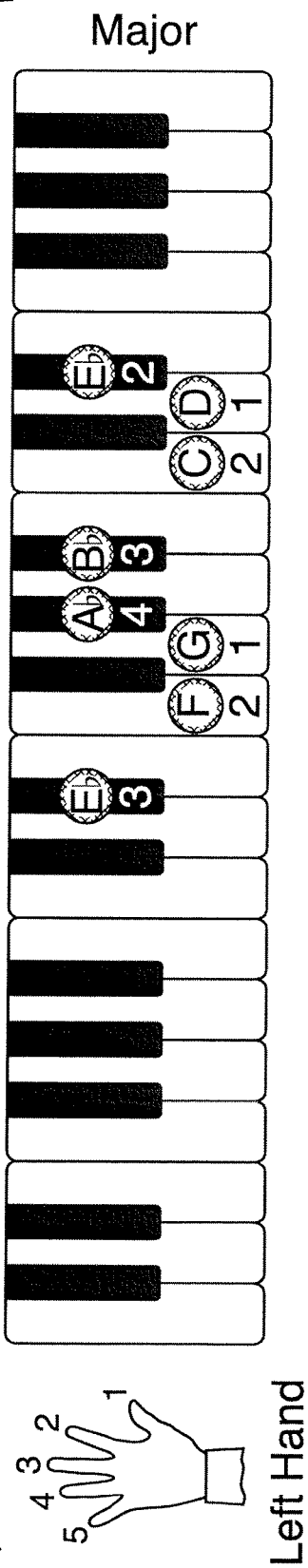
FIG. 18A is a top view of a major scale left handed piano keyboard card in the key of E♭.
Figure 18B:
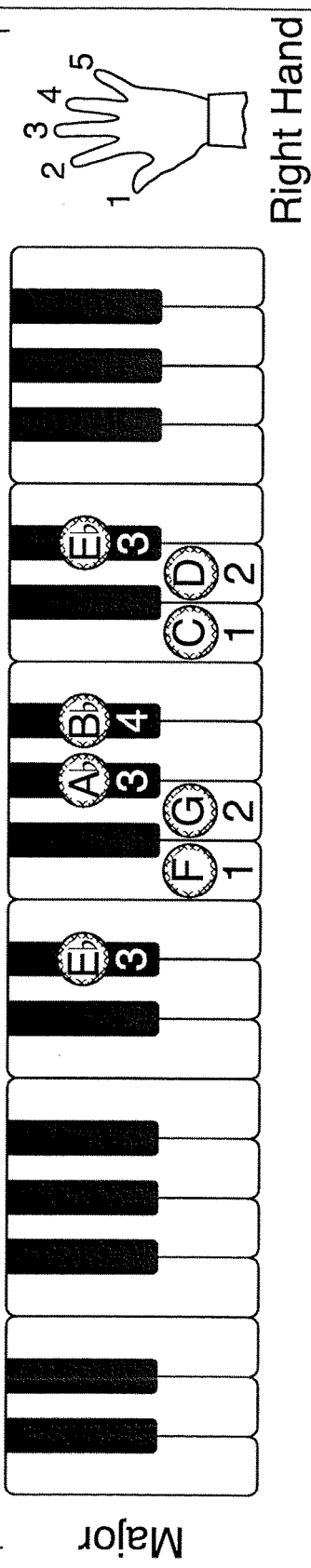
FIG. 18B is a top view of a major scale right handed piano keyboard card in the key of E♭.
Figure 22:
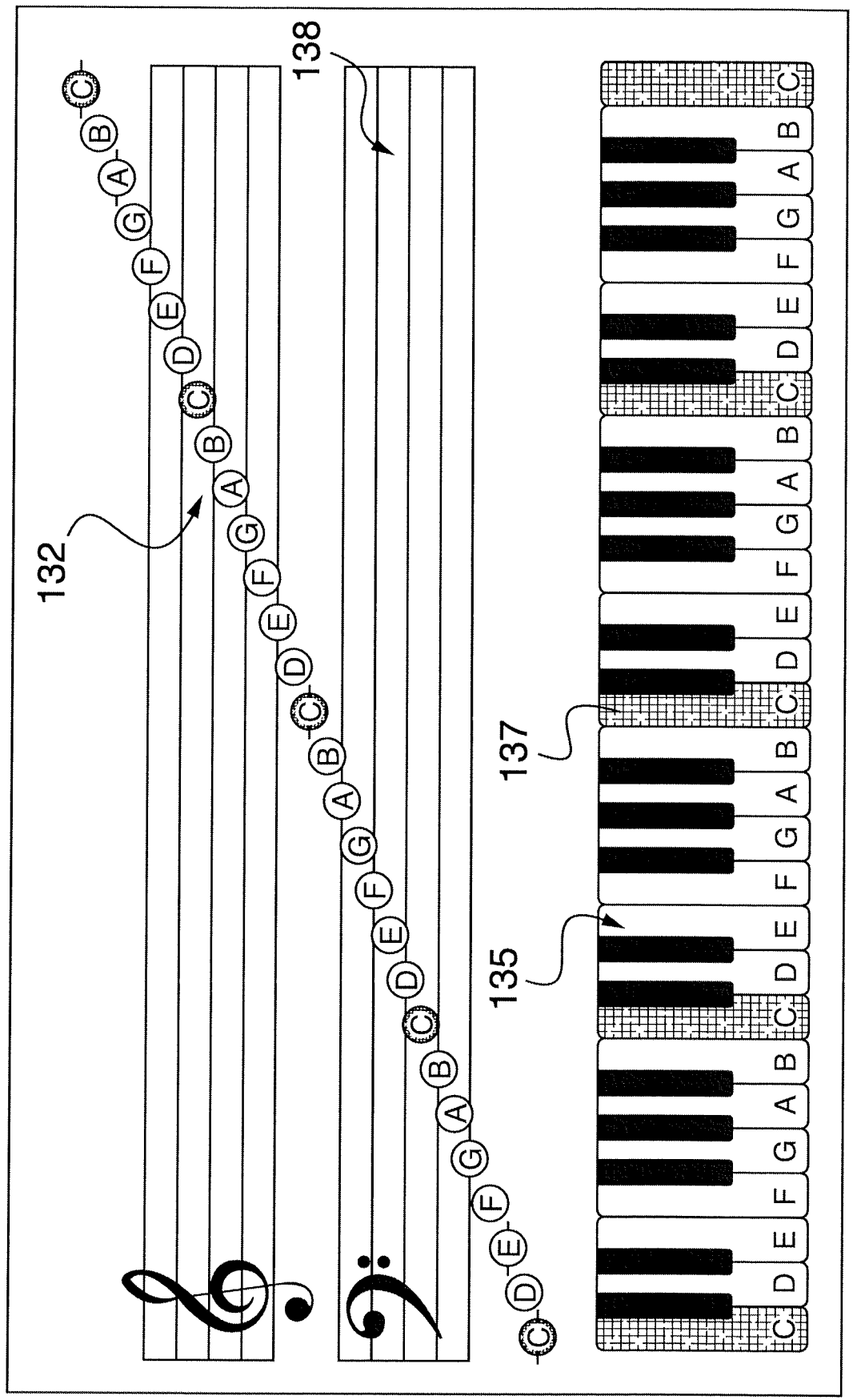
FIG. 22 is a top view of a fully combined piano sheet.

On the reverse side of each theory card, fingering card, or chord card there is illustrated a diagram 31 of a keyboard with dots of color 32 on the keys featured on the first side of that theory card, fingering card or chord card. Inside each of these colored dots 32 is the note of the key the dot is on. On the first side above the key indicator symbols 2 there are note indicator symbols 7 containing an alphabetic representation of the note of each key indicator symbol respectively. Note indicator symbols 7 are rectangular and colored in the color of the piano card. The color of the piano card is denoted by the key that the piano card is in and color coded to the musicmade EZ™ music wheel 41. Shown in FIG. 3A is music wheel 41 with the keys of C at a 12 o'clock position colored yellow 80, G at 1 o'clock position colored light green 81, D at 2 o'clock position colored dark green 82, A at 3 o'clock position colored bluish green 83, E at 4 o'clock position colored bright blue 84, B/C♭ at 5 o'clock position colored darker blue 85, G♭/F# at 6 o'clock position colored navy blue 86, D♭/C# at 7 o'clock position colored purple 87, A♭ at 8 o'clock position colored red 88, E♭ at 9 o'clock position colored reddish orange 89, B♭ at 10 o'clock position colored orange 90, F at 11 o'clock position colored yellowish orange 91.

Corresponding left hand major scales theory cards are shown linked to each position of the music wheel 41 with lines. The color of the position on the wheel 41 is the color of the note indicators and also the color of scale indicators and the color of the note dots 32 on the second sides of all piano theory cards, fingering cards 17 and all chord cards. This color coordination allows a pianist to easily find the desired key and scale.

The system has a variety of musical theory card doublets 29. Each musical theory card doublet 29 has one right hand piano card 10 and one left hand piano card 45.

Each musical theory card doublet 29 has key indicators 2 specific to only the musical notes of the musical scale of a given musical theory card doublet.

Right hand theory piano cards 10 indicate keys of a musical scale to be played by a pianist's right hand and contain a scale indicator symbol to the far right on each right hand theory piano card.

Left hand theory piano cards 11 indicate keys of that musical scale to be played by a pianist's left hand and contain a scale indicator symbol to the far left on each left hand theory piano card.

All piano cards have key indicators 2 that when properly configured spatially align the key indicators 2 with piano keys to be played of a musical scale. There are two types of key indicator symbols; ebony indicator symbols 47, ivory indicator symbols 49. Ebony indicator symbols 47 indicate ebony keys of a piano to be played of the musical scale. Ivory indicator symbols 49 indicate a group of ivory keys of a piano to be played. When all ebony indicator symbols 47 are pointing to ebony keys of a piano and all ivory indicator symbols 47 are pointing to ivory keys of a piano the piano card is configured. The group of ebony keys' notes and the group of ivory keys' notes combine to form a musical scale. The reverse or second side of piano cards contain a keyboard diagram 31 with note indicator dot 32 symbols indicating a correct placement of the piano cards. Note indicator symbol dots 32 contain an alphabetic representation of the note of each key indicator symbol respectively.

Fingering piano cards 17 are piano cards in which key indicator symbols further contain fingering indicator symbols 50 inside the triangular key indicator symbols. Fingering indicator symbols 50 indicate to a pianist which finger is to be used to strike each key respectively.

Theory piano cards 15 have key indicator symbols that contain degree indicator symbols. Degree indicator symbols indicate to a pianist which degree of the scale featured is associated with each key respectively.

There are also included a number of chord card doublets. Each chord card doublet contains information and notes pertaining to its particular musical chord. The chord piano cards have a variety of musical chord card doublets 30. Each musical chord card doublet has one right hand piano card and one left hand piano card.

There is another version of piano cards in which the ebony and ivory indicators are in the form of a piano keyboard pictograph 110. This diagram or pictograph has the same width dimensions as a piano or other keyboard so that the keys of the diagram will line up to the keys of the keyboard being played. Note indicator dots 112 are on the keys indicating the notes of the scale being played. These note indicator dots 112 are colored based on the music color wheel and the scale being played. There is an alphabetic representation of each note inside each note indicator dot. Under each dot is a fingering number 114. These fingering numbers 114 indicate which finger is to be used to play each note properly from a fingering standpoint. A fingering hand diagram 115 may be on the side of the piano keyboard card 117 to indicate which finger each number stands for respectively. This card can also be used to practice without a keyboard in that it has a keyboard on it. Users can practice their fingering on a bus, at work, wherever they want in that the keyboard has the same dimensions as a true keyboard. To do this a user "plays" the piano keyboard card 117 the same way they would play a piano especially with the same fingering. No piano sounds will be made but proper fingering can be honed. These piano keyboard cards 117 can be introduced into the system especially if the student is having trouble grasping the meaning of the other disclosed piano cards. There is a left handed piano keyboard card 119 and a right handed piano keyboard card 120 for each scale is played with different fingering for each hand. The musical set represented by a piano keyboard card may also be in the form of a chord.

Each musical chord card doublet 30 has chord indicators 74 specific to only the musical notes of the musical chord of a given musical chord card doublet. Right handed chord cards 68 have chord indicator symbols 70 colored in the color coding color of that card on the right side of that chord card. Right hand chord piano cards indicate keys of a musical chord to be played by a pianist's right hand. Left hand chord piano cards indicate keys of the musical chord to be played by the pianist's left hand. Left handed chord cards have chord indicator symbols on the left hand side of that chord card.

Chord key indicators 74 when properly configured spatially align the chord card key indicators 74 with piano keys to be played of a musical chord.

All piano cards are color coded to a music wheel 41. This music wheel 41 is composed of the circle of fifths known to musicians with the key of:

C at the 12 o'clock position Colored Yellow 80,
G at 1 o'clock position colored light green 81,
D at 2 o'clock position colored dark green 82,
A at 3 o'clock position colored bluish green 83,
E at 4 o'clock position colored bright blue 84,
B, C♭ at 5 o'clock position colored darker blue 85,
G♭, F# at 6 o'clock position colored navy blue 86,
D♭, C# at 7 o'clock position colored purple 87,
A♭ at 8 o'clock position colored red 88,
E♭ at 9 o'clock position colored reddish orange 89,
B♭, at 10 o'clock position and colored orange 90,
F at 11 o'clock position colored yellowish orange 91, Each key on the wheel 41 corresponds to a set of piano cards comprising fingering piano card doublets 28, theory card doublets 29 and chord piano card doublets 30.

The note indicator symbols 7 are colored in the key each piano card doublet corresponds to and the key of each piano card.

Musical scales currently offered are organized in various styles known as mode set. There are 12 mode sets. For the purposes of this application a mode set is defined as different kinds of scales including all modes and scales listed but not limited to:

Ionian (Major scale),
Dorian (Major scale starting on the 2nd degree),
Phrygian (Major scale starting on the 3rd degree),
Lydian (Major scale starting on the 4th degree),
Mixolydian (Major scale starting on the 5th degree),
Aeolian (Minor Scale—Major scale starting on the 6th degree),
Locrian (Major scale starting on the 7th degree),
Minor Scale,
Harmonic Minor Scale,
Melodic minor Scale,
Major Pentatonic Scale,
Minor Pentatonic Scale,
And Blues Scale.

Mode sets is a term specific to this application, however, the modes and other scales, are known to the art. Each of these mode sets has its own packet of theory card doublets 29 and its own packet of fingering card doublets 28. Each packet has piano card doublets of each key of the music wheel 41 and each key of the circle of fifths. Shown in FIG. 4(A-L) is one full mode set of theory cards as would be found in one packet. One full mode set of fingering cards 17 of that mode set would be similar with the major difference being the mode set packet would have fingering cards instead of theory cards.

Theory card doublets 29 and fingering card doublets 28 of every key of the music wheel 41 are packaged together in packets. Each packet has one mode set in it. Every mode set has its own packet of theory card doublets 29. All theory cards in one packet 78 can be seen in FIG. 4(A-L). Fingering card doublets 28 of every key of the music wheel 41 are packaged together in packets. Each packet has one mode set in it. Every mode set has its own packet for fingering card doublets 28. Every mode set has its own packet for piano keyboard card doublets. All piano keyboard cards from FIG. 10A through FIG. 21B are in one mode set and in one packet.

There is also included in this system a reference sheet with full musical scale notation labeling each note and octaves with alphabetic notation. This music notation sheet 130 can be used in conjunction with a fully labeled piano sheet 122. The fully labeled piano sheet 122 is a diagram of a piano keyboard 125 in its entirety with every note labeled 127. The 'c' notes are highlighted in yellow 128. Above the diagram of a piano keyboard there are ledger lines 131 for writing notes, drafting and composing music or other purposes. When turned sideways the notes of the fully labeled piano sheet 122 align with the music notation sheet 130 giving a user full knowledge of where each note is on a musical scale with reference to a piano.

There is also included a fully combined piano sheet 138 with musical scales 132 in music notation. Above are ledger lines 134 for notes and below is a labeled piano keyboard 135 with highlighted 'c' notes 137. This reference sheet, fully combined piano sheet 138, allows a student to have a good reference to piano notes in relation to musical scales.

A presently preferred method of learning music and piano from this apparatus has the steps of:

An aspiring pianist chooses a musical key from the music wheel 41, then finds the associated fingering cards 17 using color coding to find the fingering card doublet 28 desired key in that set. Student then looks at the second side of the fingering card doublet 28 and uses the diagrams on the back of each piano card to align each card. The left fingering card is aligned on a lower octave, the right fingering card is aligned on a higher octave.

The student then turns the fingering card doublet 28 to its first side and places the fingering card doublet 28 on a convenient ledge on the piano such as a nameboard rail and aligns the cards checking that each ebony key indicator 12 points to a black key 100 and each ivory key indicator 20 points to a white key 101. Student then plays keys indicated by the key indicators 2 from left to right with fingers indicated by the fingering indicator symbols 50. Student then plays the keys of the fingering card doublet 28 right to left. Then student plays fingering card doublet 28 left to right and right to left until desired proficiency is reached. If the student is having trouble grasping the concept the student then finds the packet of piano keyboard cards for the set of fingering cards of the same mode set and key the student was using. Student then uses the diagrams of each piano keyboard card to align each card. The left piano keyboard card is aligned on a lower octave, the right piano keyboard card is aligned on a higher octave. The student then places the piano keyboard card doublet 121 on a convenient ledge on the piano and aligns 99 checking that each ebony key points to a black key 100 and each ivory key points to a white key 101. Student then plays the keys indicated by the note indicator dots with the fingers indicated by the note indicator numbers from left to right as before but taking note of degrees of the scale of that piano keyboard card doublet 121. Student then plays the keys of the piano keyboard card doublet 121 right to left. Student then plays piano keyboard card doublet 121 left to right and right to left until desired proficiency is reached and the student is familiar with degrees of the scale of that piano keyboard card doublet 121. Student then finds the packet of theory cards for the set of fingering cards of the same mode set and key the student was using. Student then looks at the second side of the theory card doublet 29 and uses the diagrams on the back of each piano card to align each card. The left theory card is aligned on a lower octave, the right theory card is aligned on a higher octave. The student then turns the theory card doublet 29 to its first side and places the theory card doublet 29 on a convenient ledge on the piano and aligns 99 checking that each ebony key indicator 12 points to a black key 100 and each ivory key indicator 20 points to a white key 101. Student then plays the keys indicated by the key indicators 2 from left to right as before but taking note of degrees of the scale of that theory card doublet 29. Student then plays the keys of the theory card doublet 29 right to left. Student then plays theory card doublet 29 left to right and right to left until desired proficiency is reached and the student is familiar with degrees of the scale of that theory card doublet 29. Student then finds the chord card packet for the mode set of the theory card doublet 29 just played. Using color coding student finds chord cards of the desired key in the chord card packet. Student then looks at the second side of the chord cards and uses the diagrams of piano keys to align cards. The student then turns the chord cards to their first side and places the chord cards on a convenient ledge such as a nameboard rail on the piano and aligns checking that each ebony key indicator 12 points to a black key 100 and each ivory key indicator 20 points to a white key. Student then plays the keys indicated by the chord card key indicators 74 together until desired proficiency is reached. Student then finds another chord card and repeats the steps of: finding a chord card packet for the mode set of the theory card doublet 29 just played, using color coding student finds chord cards of the desired key in the chord card packet, student then looks at the second side of the chord cards and uses the diagrams of piano keys to align those cards. The student then turns the chord cards to their first side and places the chord cards on a convenient ledge on the piano and aligns checking that each ebony key indicator 12 points to a black key 100 and each ivory key indicator points to a white key. Student then plays keys indicated by the key indicators together until desired proficiency is reached until all chord cards of that mode set are learned. Student then repeats these steps with different musical keys and different mode sets until all mode sets in all keys are learned to a desired proficiency. During this process the student uses the fully combined piano sheet 138, the fully labeled piano sheet 122 and music notation sheet 130 as reference in understanding scales and notes of the piano as desired.

The present invention may be embodied in other specific forms without departing from the spirit or essential attributes thereof and, accordingly, reference should be made to the appended claims, rather than to the foregoing specification as indicating the scope of the invention.

I claim:

1. An apparatus comprising:
    Piano keyboard cards having a first and second side,
        said first side comprising keyboard pictographs,
            said keyboard pictographs when properly configured spatially align with piano keys of a musical scale to be played,
            said keyboard pictographs comprising;
                ebony indicator symbols and ivory indicator symbols;
                    said ebony indicator symbols indicate ebony keys of a piano to be played of said musical scale,
                    said ivory indicator symbols indicate a group of ivory keys of a piano to be played,
                    when all said ebony indicator symbols are aligned with a group of ebony keys of a piano and all of said ivory indicator symbols are aligned with ivory keys of said piano said piano card is configured,
                    said group of ebony keys and said group of ivory keys combine to form a musical scale,
        said piano cards comprising a number of piano card doublets,
            each said piano card containing information and notes pertaining to a particular musical scale,
    said apparatus further comprising;
        a variety of said piano card doublets each said musical card doublet has one right hand piano card and one left hand piano card,
        each said piano card doublet has said keyboard pictographs specific to only the musical notes of the musical scale of a given piano card doublet,
            said right hand piano cards that indicate keys of said musical scale to be played by a pianist's right hand and
            said left hand piano cards that indicate keys of said musical scale to be played by said pianist's left hand.

2. Apparatus as described in claim 1 wherein said key indicator symbols further comprise note indicator symbols, containing an alphabetic representation of the note of each key indicator symbol respectively;
    piano card doublets further comprise fingering card doublets,
    said fingering card doublets are piano card doublets wherein said key indicator symbols further comprise fingering indicator symbols,
        said fingering indicator symbols indicate to a pianist which finger is to be used to strike each key respectively;
        said fingering indicator symbols comprise numbers from 1 to 5,
    said numbers designate which finger is to be played with: "1" designating thumb, "2" designating index finger, "3" designating middle finger, "4" designating ring finger and "5" designating pinky finger respectively;
    said piano card doublets further comprise theory card doublets;
    said theory card doublets are piano card doublets wherein said key indicator symbols further comprise degree indicator symbols,
        said degree indicator symbols indicate, to a pianist, which degree of said scale featured, in said theory card doublet, is associated with each key respectively;
    further comprising, a number of chord cards, each having a first and second side,
        said first side of said chord card comprising, information and notes pertaining to a particular musical chord;
            each chord card having a number of chord card key indicators,
                said chord card key indicators indicate to a pianist specific musical notes to be played of the musical chord of a given chord card;
            said chord card key indicators, when properly configured, spatially align; said chord card key indicators with piano keys to be played of a musical chord;
        said chord card key indicators comprise:
            ebony chord key indicator symbols and ivory chord key indicator symbols;
                said ebony chord key indicator symbols indicate ebony keys of a piano to be played of said musical chord,
                said ivory chord key indicator symbols indicate a group ivory keys of a piano to be played of said musical chord;
                when all said ebony chord key indicator symbols are aligned with a correct group of ebony keys, of a piano, and all of said ivory chord key indicator symbols are aligned with correct group of ivory keys, of said piano, said piano card is configured;
when all said ebony chord key indicator symbols are aligned correctly said ivory chord key indicator symbols point to ivory keys of a piano and
said ebony chord key indicator symbols point to ebony keys of a piano and at least one note has been checked to be correct said chord card is configured;
said correct group of ebony keys and said correct group of ivory keys combine to form a musical chord and there may be three of these same chords found on each piano in different octaves,
chord key indicator symbols contain degree symbols;
said degree symbols indicate to a pianist the degree of the scale of each key to be played of said chord card;
said chord key indicator symbols further comprise chord note indicator symbols,
said chord note indicator symbols contain alphabetic notation of notes played in said chord,
said piano cards and chord cards are color coded to a music wheel,
Said music wheel is comprised of the circle of fifths known to musicians with the key of:
C at the 12 o'clock position,
G at 1 o'clock position,
D at 2 o'clock position,
A at 3 o'clock position,
E at 4 o'clock position,
B at 5 o'clock position,
F# at 6 o'clock position,
D♭ at 7 o'clock position,
A♭ at 8 o'clock position,
E♭ at 9 o'clock position,
B♭ at 10 o'clock position and
F at 11 o'clock position each key on said wheel corresponds to a key color,
each of said key colors corresponds to a set of fingering card doublets, theory card doublets and chord piano cards,
said note indicator symbols and said chord note indicator symbols are colored in the key color each piano card set corresponds.

3. Apparatus as described in claim 2 wherein said piano cards and said chord cards have a height in the range between one and three inches;
preferably 1⅝ inches and a length in a range between seven and nine inches;
preferably about 8 inches long.

4. Apparatus as described in claim 3 wherein said
key indicator symbols and said chord key indicator symbols comprise the shape of isosceles triangles pointed downwards towards said keys being indicated,
said ebony key indicator symbols and said ebony chord key indicator symbols are colored in black,
said ivory key indicator symbols and said ivory chord key indicator symbols are colored in white.

5. Apparatus as described in claim 4 wherein, said note indicator symbols and said chord note indicator symbols comprise the shape of a rectangle just above said isosceles triangle shape;
said rectangle contains said alphabetic notation of said note indicated inside said rectangle and
said rectangles are colored in that cards key color.

6. Apparatus as described in claim 5 wherein, said piano cards' second sides comprise a diagram of piano keys;
said diagram of piano keys having indicator dots;
said indicator dots show a pianist where to place the piano card;
said chord cards' second sides comprise a diagram of piano keys for chords;
said diagram of piano keys for chords having indicator dots on said keys of said diagram;
said indicator dots show a pianist where to place said chord card on said piano.

7. Apparatus as described in claim 6 wherein theory card doublets, of every key, of said music wheel, are packaged together in packets;
each said packet has one mode set in it;
every mode set has its own packet for theory card doublets;
fingering card doublets, of every key, of said music wheel, are packaged together in packets;
each said packet has one mode set in it and every mode set has its own packet for fingering card doublets;
said chord cards have a left cord card and a right chord card creating chord card doublets;
said chord card doublets, of every chord, are packaged together in packets.

8. Apparatus comprising:
piano keyboard cards having a first and second side,
said first side comprising keyboard pictographs,
said keyboard pictographs when properly configured spatially align with piano keys of a musical scale to be played,
said keyboard pictographs comprising;
ebony key symbols and ivory key symbols;
when all said ebony key symbols are aligned with a group of ebony keys of a piano and all of said ivory indicator symbols are aligned with ivory keys of said piano said piano keyboard card is configured,
said ebony and ivory key symbols are selectively dotted with note indicator dots;
said note indicator dots comprise a symbol indicating the note of that key symbol;
said note indicator dots combine to form a musical scale,
said piano keyboard cards comprising a number of piano keyboard card doublets,
each said piano keyboard card containing information and notes pertaining to a particular musical scale,
said apparatus further comprising;
a variety of said piano keyboard card doublets each said musical keyboard card doublet has one right hand piano keyboard card and one left hand piano keyboard card,
each said piano keyboard card doublet has said keyboard pictographs specific to only the musical notes of the musical scale of a given piano keyboard card doublet,
said right hand piano keyboard cards that indicate keys of said musical scale to be played by a pianist's right hand and
said left hand piano keyboard cards that indicate keys of said musical scale to be played by said pianist's left hand.

9. Apparatus as described in claim 8 wherein below said note indicator dots there are fingering numbers;

each said fingering number indicates to a pianist which finger to use to play each note of that hand;

said fingering numbers are different per note indicator dot for the left handed piano keyboard card and the right hand keyboard cards of the same scale.

10. Apparatus as described in claim 9 wherein said fingering numbers are substantially the same as fingering indicator symbols.

11. Apparatus as described in claim 10 wherein said piano keyboard cards further comprise a representation of a hand on each piano keyboard card;

said representations of hands are labeled with numbers for each finger of said hand corresponding to the numbers of said fingering numbers;

said Note indicator dots are colored in a different color for each scale.

12. Apparatus as described in claim 11 wherein said piano keyboard cards' scale comprise chords.

13. Apparatus as described in claim 12, wherein said piano keyboard cards are color coded to a music wheel, said music wheel is comprised of the circle of fifths known to musicians with the key of:
C at the 12 o'clock position,
G at 1 o'clock position,
D at 2 o'clock position,
A at 3 o'clock position,
E at 4 o'clock position,
B at 5 o'clock position,
F# at 6 o'clock position,
D♭ at 7 o'clock position,
A♭ at 8 o'clock position,
E♭ at 9 o'clock position,
B♭ at 10 o'clock position and
F at 11 o'clock position
each key on said wheel corresponds to a key color,
each of said key colors corresponds to a set of piano keyboard cards;
said note indicator symbols and said chord note indicator symbols are colored in the key color each piano card set corresponds.

14. Apparatus as described in claim 13 wherein said piano keyboard cards and said chord cards have a height in the range between one and three inches;
preferably 1⅝ inches and a length in a range between seven and nine inches;
preferably about 8 inches long.

15. Apparatus as described in claim 14 wherein theory card doublets, of every key, of said music wheel, are packaged together in packets;
each said packet has one mode set in it;
every mode set has its own packet for theory card doublets;
fingering card doublets, of every key, of said music wheel, are packaged together in packets;
each said packet has one mode set in it and every mode set has its own packet for fingering card doublets;
piano keyboard card doublets, of every key, of said music wheel, are packaged together in packets;
each said packet has one mode set in it and every mode set has its own packet for piano keyboard card doublets;
said chord cards have a left cord card and a right chord card creating chord card doublets;
said chord card doublets, of every chord, are packaged together in packets.

16. Apparatus as described in claim 15 further comprising a music notation sheet;

said music notation sheet comprises a reference sheet with full musical scale notation labeling each note and octaves with alphabetic notation.

17. Apparatus as described in claim 16 further comprising a fully labeled piano sheet;
said fully labeled piano sheet is a diagram of a piano keyboard in its entirety with every note labeled;
when turned sideways the notes of said fully labeled piano sheet may align with the music notation sheet giving a user full knowledge of where each note is on a musical scale with reference to a piano.

18. Apparatus as described in claim 17 further comprising a music combination sheet.

19. A method comprising the steps of:
providing the apparatus of claim 18 to a pianist;
the pianist chooses a musical key from said music wheel;
finds said associated fingering cards;
uses said color coding to find the fingering card doublet desired key in that mode set;
student then looks at said second side of fingering card doublet and uses said diagrams on the back of each piano card to align each card;
said left fingering card is aligned on a lower octave;
said right fingering card is aligned on a higher octave;
said student then turns said fingering card doublet to its first side and places said fingering card doublet on a convenient ledge on said piano and aligns checking that each ebony key indicator points to a black key and each ivory key indicator points to a white key;
student then plays keys indicated by said key indicators from left to right with fingers indicated by said fingering indicator symbols;
student then plays said keys of said fingering card doublet right to left similarly;
student then plays fingering card doublet left to right and right to left until desired proficiency is reached;
student then finds the packet of theory cards for that set of fingering cards that student was using;
using color coding said student finds the theory card doublet associated with said fingering card doublet that was just used;
student then looks at said second side of said theory card doublet and uses said diagrams on the back of each piano card to align each card;
said left theory card is aligned on a lower octave;
said right theory card aligned on a higher octave;
said student then turns said theory card doublet to its first side and places said theory card doublet on a convenient ledge on said piano and aligns checking that each ebony key indicator points to a black key and each ivory key indicator points to a white key;
student then plays keys indicated by said key indicators from left to right as before but taking note of degrees of the scale of that said theory card doublet;
student then plays said keys of said theory card doublet right to left;
student plays theory card doublet left to right and right to left until desired proficiency is reached and said student is familiar with degrees of the scale of that theory card doublet;
student then finds chord card packet for the mode set of the theory card doublet just played;
using color coding student finds chord cards of said desired key in said chord card packet;
student then looks at said second side of said chord cards and uses said diagrams of piano keys to align card;
said student then turns said chord cards to its first side and places said chord card on a convenient ledge on said piano and aligns checking that each ebony key indicator points to a black key and each ivory key indicator points to a white key;
student then plays keys indicated by said key indicators together until desired proficiency is reached student then finds another chord card and repeats the steps of:
student then finds chord card packet for the mode set of the theory card doublet just played;
   using color coding student finds chord cards of said desired key in said piano keyboard card packet;
   student then looks at said second side of said piano keyboard cards and uses said pictographs of piano keys to align card;
   said student then turns said piano keyboard cards to its first side and places said piano keyboard card on a convenient ledge on said piano and aligns checking that each ebony key indicator points to a black key and each ivory key indicator points to a white key;
   student then plays keys indicated by said key indicators together until desired proficiency is reached until all piano keyboard cards of that mode set are learned;
   student then repeats these steps with different musical keys and different mode sets until all mode sets in all keys are learned to a desired proficiency.

\* \* \* \* \*